United States Patent
Kim et al.

(10) Patent No.: US 12,163,731 B2
(45) Date of Patent: Dec. 10, 2024

(54) ARTIFICIAL INTELLIGENCE REFRIGERATOR AND OPERATING METHOD THEREFOR

(71) Applicant: LG Electronics Inc., Seoul (KR)

(72) Inventors: Jinok Kim, Seoul (KR); Youngtag Kwon, Seoul (KR); Sangyun Kim, Seoul (KR); Hyunsung Park, Seoul (KR); Joongkeun Lee, Seoul (KR); Sungmok Hwang, Seoul (KR); Jeongyo Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 330 days.

(21) Appl. No.: 17/790,606

(22) PCT Filed: Jan. 6, 2020

(86) PCT No.: PCT/KR2020/000215
§ 371 (c)(1),
(2) Date: Jul. 1, 2022

(87) PCT Pub. No.: WO2021/137345
PCT Pub. Date: Jul. 8, 2021

(65) Prior Publication Data
US 2023/0043011 A1 Feb. 9, 2023

(30) Foreign Application Priority Data
Jan. 3, 2020 (KR) .................. 10-2020-0000913

(51) Int. Cl.
*F25D 29/00* (2006.01)
*F25D 25/02* (2006.01)
(Continued)

(52) U.S. Cl.
CPC ........... *F25D 29/00* (2013.01); *F25D 25/025* (2013.01); *H04L 67/12* (2013.01);
(Continued)

(58) Field of Classification Search
CPC .............. F25D 29/00; F25D 2400/361; F25D 2500/06; F25D 2700/02; F25D 2700/06
See application file for complete search history.

(56) References Cited

U.S. PATENT DOCUMENTS

| 9,860,491 | B2 | 1/2018 | Park et al. |
|---|---|---|---|
| 2019/0392382 | A1 | 12/2019 | Han |
| 2020/0041200 | A1 | 2/2020 | No |

FOREIGN PATENT DOCUMENTS

| AU | 2016415984 | 7/2018 |
|---|---|---|
| EP | 2995888 | 3/2016 |

(Continued)

OTHER PUBLICATIONS

KR 2018-0013448 (English Translation) (Year: 2018).*
Extended European Search Report in European Appln. No. 20910296.1, mailed on Dec. 13, 2023, 8 pages.

*Primary Examiner* — Jonathan Bradford
(74) *Attorney, Agent, or Firm* — Fish & Richardson P.C.

(57) ABSTRACT

An artificial intelligence refrigerator includes: a display, a cabinet having a storage room receiving food, a camera provided in the cabinet and capturing an image of the storage room, a storage room sensor detecting whether the storage room is opened or closed, and a processor configured to control, based on the storage room sensor detecting that the storage room is opened, the camera to capture the image of the storage room, transmit, based on a maximum opening time point or a closing time point of the storage room being detected through processing of the captured image, a capture command to the camera, the closing time point being a time point at which the storage room starts closing, acquire a storage state of the storage room based on an image captured according to the capture command, and control the display to display food management information based on the acquired storage state.

20 Claims, 35 Drawing Sheets

(51) Int. Cl.
*H04L 67/12* (2022.01)
*G06T 7/00* (2017.01)

(52) U.S. Cl.
CPC .... *F25D 2400/361* (2013.01); *F25D 2500/06* (2013.01); *F25D 2700/02* (2013.01); *F25D 2700/06* (2013.01); *G06T 7/00* (2013.01)

(56) References Cited

FOREIGN PATENT DOCUMENTS

| | | |
|---|---|---|
| JP | 2019168134 | 10/2019 |
| KR | 20140125105 | 10/2014 |
| KR | 10-2018-0013448 | 2/2018 |
| KR | 20180100636 | 9/2018 |
| KR | 20190096880 | 8/2019 |
| KR | 20190137271 | 12/2019 |
| KR | 102273192 | 7/2021 |
| WO | WO2018016054 | 1/2018 |

* cited by examiner

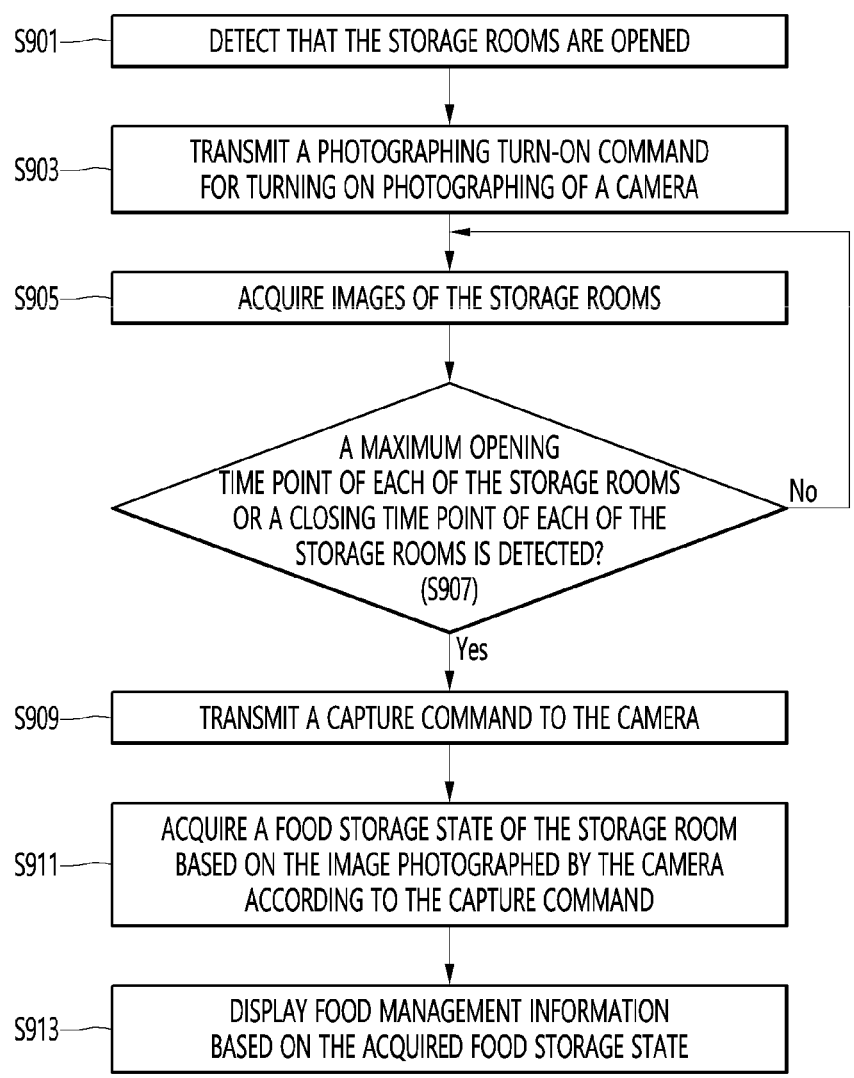

FIG. 19D

| Food Inventory | | | 1937 1939 |
|---|---|---|---|

Crisper

| Item | No. of items | Storage Duration | Shop |
|---|---|---|---|
| ⓘ Pear | x 3 | 1 day | ⓘ —1935 |
| ⓘ Apple | x 3 | 1 day | ⓘ |
| ⓘ Eggplant | x 3 | 1 day | ⓘ |
| ⓘ Cabbage | x 1 | 1 day | ⓘ |

Door-in-Door

| Item | No. of items | Storage Duration | Shop |
|---|---|---|---|
| ⓘ Juice | x 3 | 1 day | ⓘ |
| ⓘ Iced tea | x 1 | 1 day | ⓘ |
| ⓘ Sparkling water | x 5 | 1 day | ⓘ |
| ⓘ Milk | x 1 | 1 day | ⓘ |

*Navigation bar*

< Search

🔍 eggplant  (X)

5 recipes were found

| | Cedar Planked Salmon with Sweet Soy Basting Sauce | Favorites |
| | Eggplant Parmesan with Homemade Red Sauce | Favorites |
| | Grilled Eggplant with Red Onion | Favorites |
| 1971 — | Ratatouille over Soft Polenta | Favorites |
| | Veggie Chili | Favorites |

Navigation bar

Figure 19H:
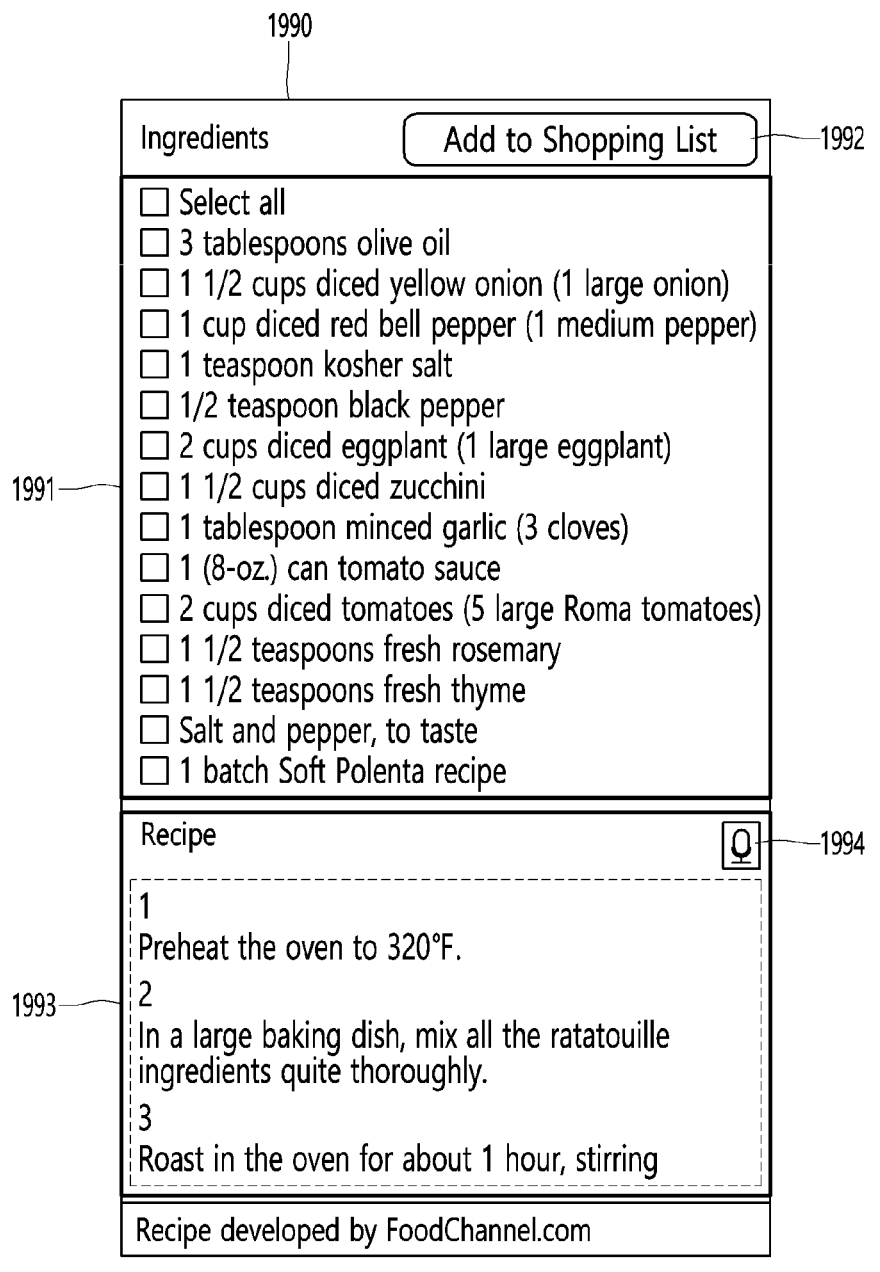

| Ingredients | Add to Shopping List — 1992 |

1991 —
- ☐ Select all
- ☐ 3 tablespoons olive oil
- ☐ 1 1/2 cups diced yellow onion (1 large onion)
- ☐ 1 cup diced red bell pepper (1 medium pepper)
- ☐ 1 teaspoon kosher salt
- ☐ 1/2 teaspoon black pepper
- ☐ 2 cups diced eggplant (1 large eggplant)
- ☐ 1 1/2 cups diced zucchini
- ☐ 1 tablespoon minced garlic (3 cloves)
- ☐ 1 (8-oz.) can tomato sauce
- ☐ 2 cups diced tomatoes (5 large Roma tomatoes)
- ☐ 1 1/2 teaspoons fresh rosemary
- ☐ 1 1/2 teaspoons fresh thyme
- ☐ Salt and pepper, to taste
- ☐ 1 batch Soft Polenta recipe Recipe  🎤 —1994

1993 —
1
Preheat the oven to 320°F.
2
In a large baking dish, mix all the ratatouille ingredients quite thoroughly.
3
Roast in the oven for about 1 hour, stirring Recipe developed by FoodChannel.com

ARTIFICIAL INTELLIGENCE REFRIGERATOR AND OPERATING METHOD THEREFOR

CROSS-REFERENCE TO RELATED APPLICATIONS

This application is a National Stage application under 35 U.S.C. § 371 of International Application No. PCT/KR2020/000215, filed on Jan. 6, 2020, which claims the benefit of Korean Patent Application No. 10-2020-0000913, filed on Jan. 3, 2020. The disclosures of the prior applications are incorporated by reference in their entirety.

TECHNICAL FIELD

The present invention relates to an artificial intelligence refrigerator, and more particularly, to an artificial intelligence refrigerator which is capable of photographing the inside of a refrigerator to recognize foods based on a photographed image.

BACKGROUND ART

A refrigerator is a device that supplies cold air generated by a refrigeration cycle to a refrigerating compartment and a freezing compartment to maintain freshness of various foods for a long period of time.

Generally, a refrigerator is configured to include a main body having a refrigerating compartment and a freezing compartment for storing foods and a door rotatably coupled to one side of the main body to open and close the refrigerating compartment and the freezing compartment.

The refrigerating compartment is divided into a plurality of spaces by shelves so that accommodation and storage are efficiently carried out according to the type of stored objects. A storage room for storing meat and fish is provided in an upper region of the refrigerating compartment, and a storage room for storing vegetables, fruits, etc. is provided in a lower region of the refrigerating compartment.

In recent years, as demands for advanced refrigerators have gradually increased due to the improvement of living environments, a display is provided on the door of the refrigerator to provide information about the refrigerator and to control the refrigerator.

In order for the user to check contents of the current refrigerator, it is inconvenient to open the refrigerator door and look the inside of the refrigerator.

Korean Patent Publication (Publication No: 10-2014-0059978) discloses that, when food, to which an RFID tag is attached, enters the refrigerator, information is read and stored through an RFID reader, and after the storage is completed, an image including a user's face is obtained from a camera. Also, there is disclosed a content of classifying users from the acquired image and recommending food or controlling the refrigerator door according to user's characteristics.

However, since the RFID tag has to be attached to the food taken in the refrigerator, it is impossible to recognize the food without the RFID tag, and there is a problem in that costs for attaching the RFID tag are generated.

DISCLOSURE OF THE INVENTION

Technical Problem

An object of the present invention is to provide a food storage state in a storage room of a refrigerator using a camera provided in the refrigerator.

An object of the present invention is to provide an artificial intelligence refrigerator capable of accurately identifying a food storage state in a storage room of the refrigerator.

An object of the present invention is to provide an artificial intelligence refrigerator capable of identifying a food storage state in a storage room of a refrigerator, managing food inventory, inducing food purchase, and recommending a recipe for cooking using food.

Technical Solution

An artificial intelligence refrigerator according to an embodiment of the present invention may turn on a camera so as to photograph a storage room when opening of a storage room is detected, transmit a capture command to the camera when a maximum opening time point of the storage room or a closing time point, at which the closing of the storage room starts, is detected through processing of an image acquired according to the photographing of the camera, acquire a food storage state of the storage room based on the image captured according the capture command; and display food management information on the display based on the acquired food storage state.

The artificial intelligence refrigerator according to an embodiment of the present invention may acquire a time point, at which a moving direction of the storage room is switched from an opening direction to a closing direction, as the closing time point.

The artificial intelligence refrigerator according to an embodiment of the present invention may acquire a plurality of images respectively corresponding to a plurality of photographing time points of the camera; and extract an image having a maximum surface area of the storage room among the plurality of acquired images and acquire a photographing time point of the extracted image as a maximum opening time point of the storage room.

The artificial intelligence refrigerator according to an embodiment of the present invention may display the food management information, which comprises one or more of inventory change information of the food, purchase linkage information of the food, and recipe information of a dish using the food, on the display based on the storage state.

Advantageous Effects

According to the embodiment of the present invention, the user may easily and quickly check the information on the storage state of the food stored in the storage room of the refrigerator.

According to the embodiment of the present invention, the information on the storage state of the storage room of the refrigerator may be accurately determined, and the information on the correct storage state may be provided to the user.

According to the embodiment of the present invention, the user's convenience in using the refrigerator may be greatly improved through the food inventory management in the storage room, the purchase linkage service, and the recipe recommendation function.

BRIEF DESCRIPTION OF THE DRAWINGS

FIG. 9 is a flowchart illustrating a method for operating a refrigerator according to an embodiment of the present invention.

FIGS. 19a to 19h are views for explaining a process of displaying food management information on a transparent display and providing recipe information related to stored foods when the foods are stored in a storage room of the refrigerator according to an embodiment of the present invention.

MODE FOR CARRYING OUT THE INVENTION

<Artificial Intelligence (AI)>

Figure 1:
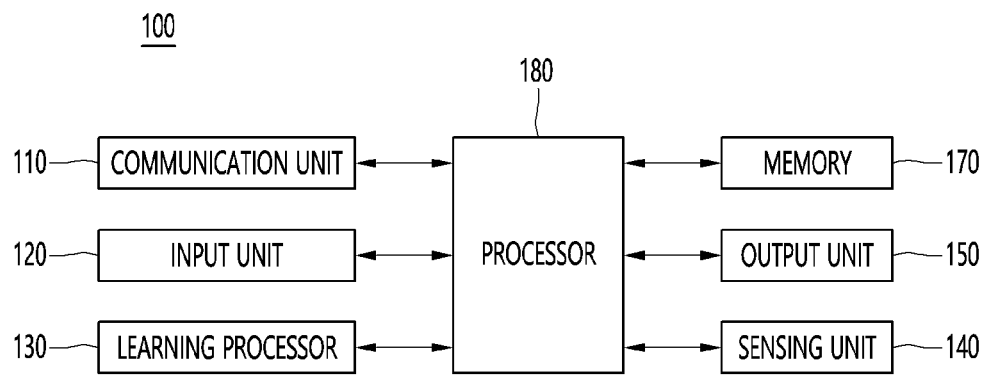
FIG. 1 is a view of an AI device according to an embodiment of the present disclosure.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of training an artificial neural network in a state in which a label for learning data is given, and the label may mean the correct answer (or result value) that the artificial neural network must infer when the learning data is input to the artificial neural network. The unsupervised learning may refer to a method of training an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

In this case, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used if an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Here, examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display outputting visual information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
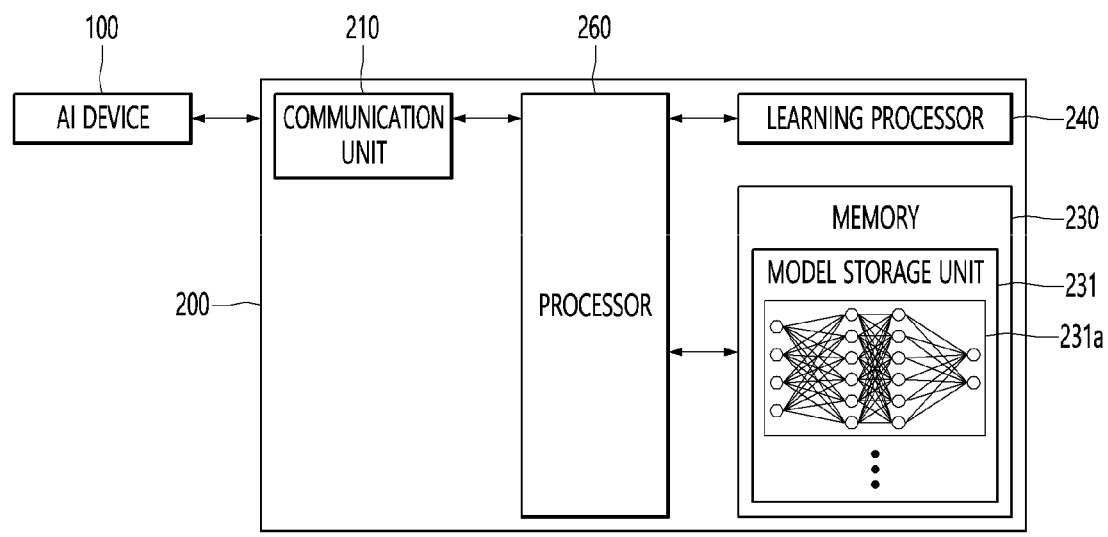
FIG. 2 is a view of an AI server according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. In this case, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 may transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
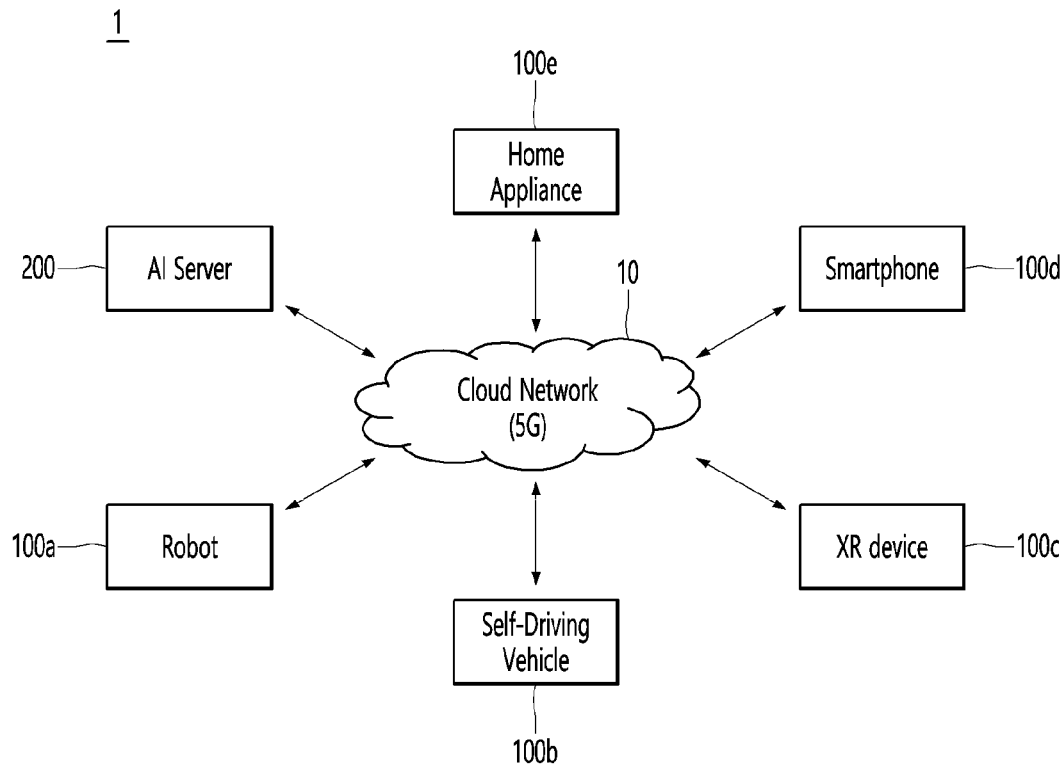
FIG. 3 is a view of an AI system according to an embodiment of the present disclosure.

FIG. 3 is a view of an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the accommodated input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

Figure 4:
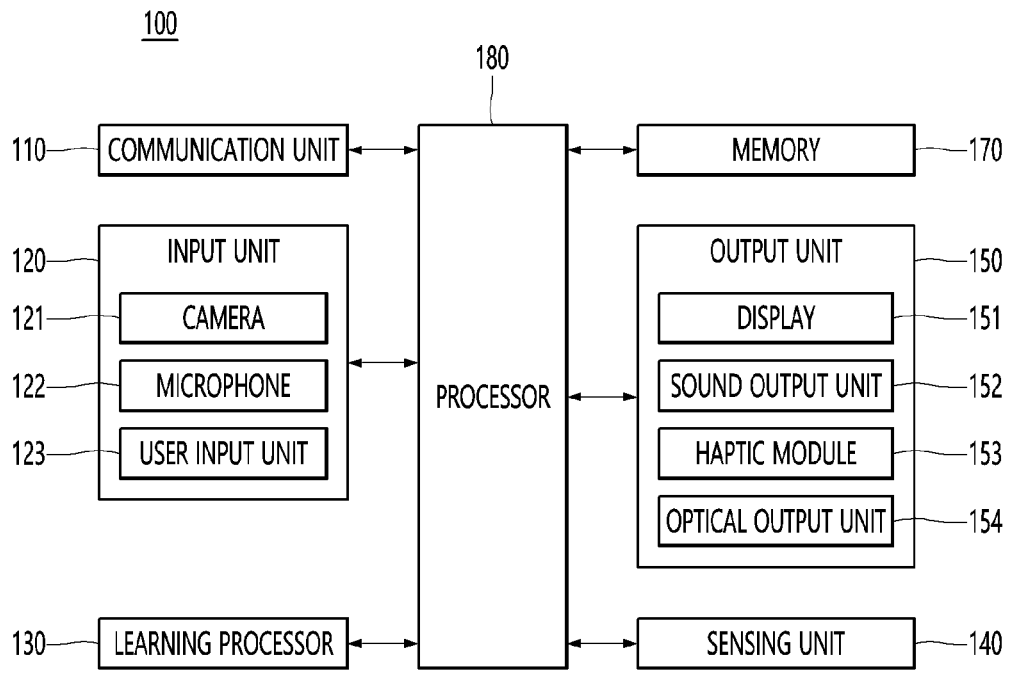
FIG. 4 is a view of an AI device according to another embodiment of the present disclosure.

FIG. 4 illustrates an AI device 100 according to an embodiment of the present disclosure.

The redundant repeat of FIG. 1 will be omitted below.

Referring to FIG. 4, the input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video acquired by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and if information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The output unit 150 may include at least one of a display unit 151, a sound output unit 152, a haptic module 153, or an optical output unit 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output unit 152 may output audio data received from the wireless communication unit 110 or stored in the memory 170 in a call signal reception or call mode, a recording mode, a voice recognition mode, or a broadcast reception mode.

The sound output unit 152 may include a receiver, a speaker, and a buzzer.

The haptic module 153 generates various haptic effects that a user may feel. A representative example of a haptic effect that the haptic module 153 generates is vibration.

The optical output unit 154 outputs a signal for notifying event occurrence by using light of a light source of the mobile terminal 100. An example of an event occurring in the AI device 100 includes message reception, call signal reception, missed calls, alarm, schedule notification, e-mail reception, and information reception through an application.

A refrigerator to be described below may be a home appliance having artificial intelligence. That is, the artificial intelligence device 100 may be a refrigerator.

The refrigerator may include all of the components of the artificial intelligence device 100 illustrated in FIG. 4.

The refrigerator may be named as an artificial intelligence refrigerator.

Figure 5A:
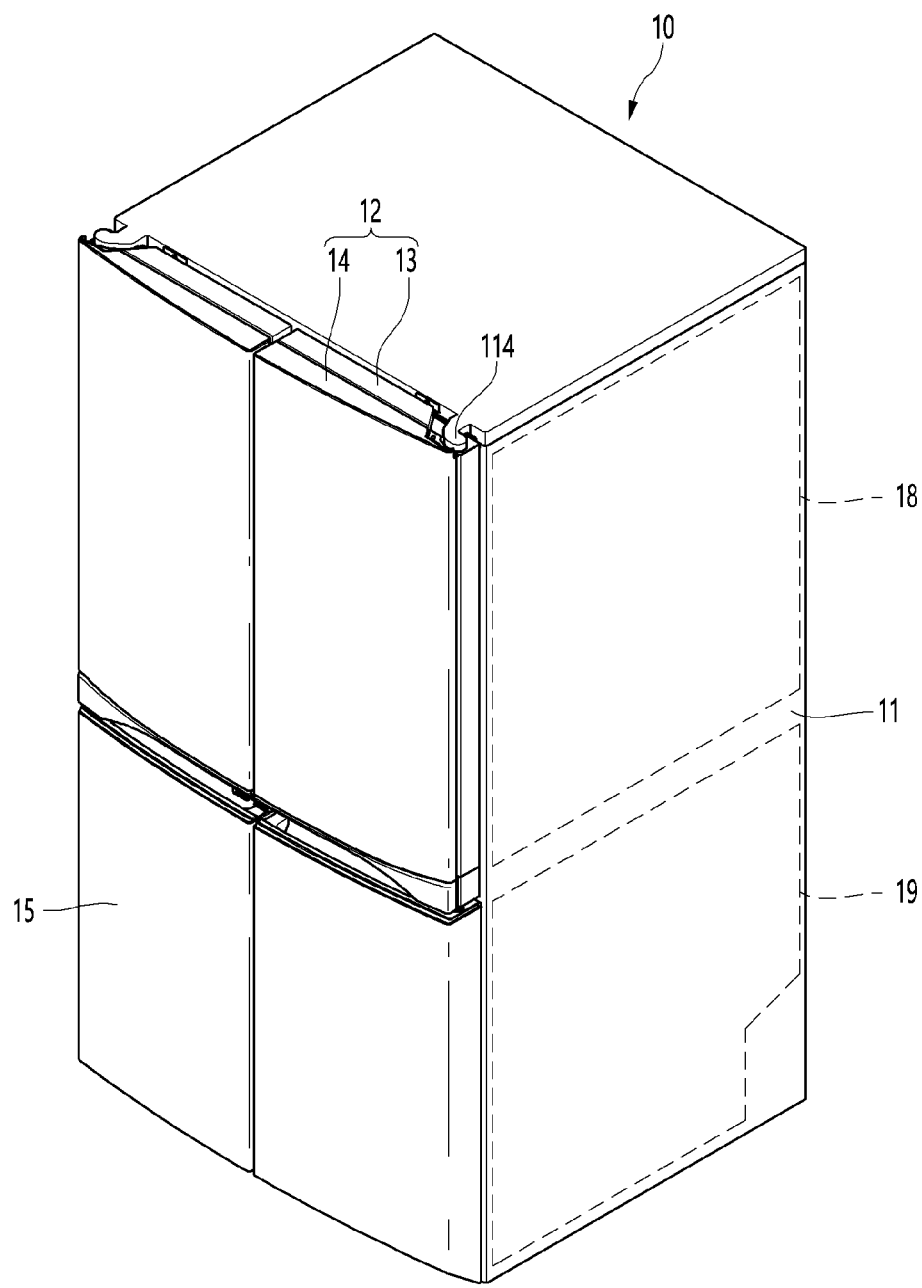
FIG. 5a is a perspective view of a refrigerator according to an embodiment of the present invention.
Figure 5B:
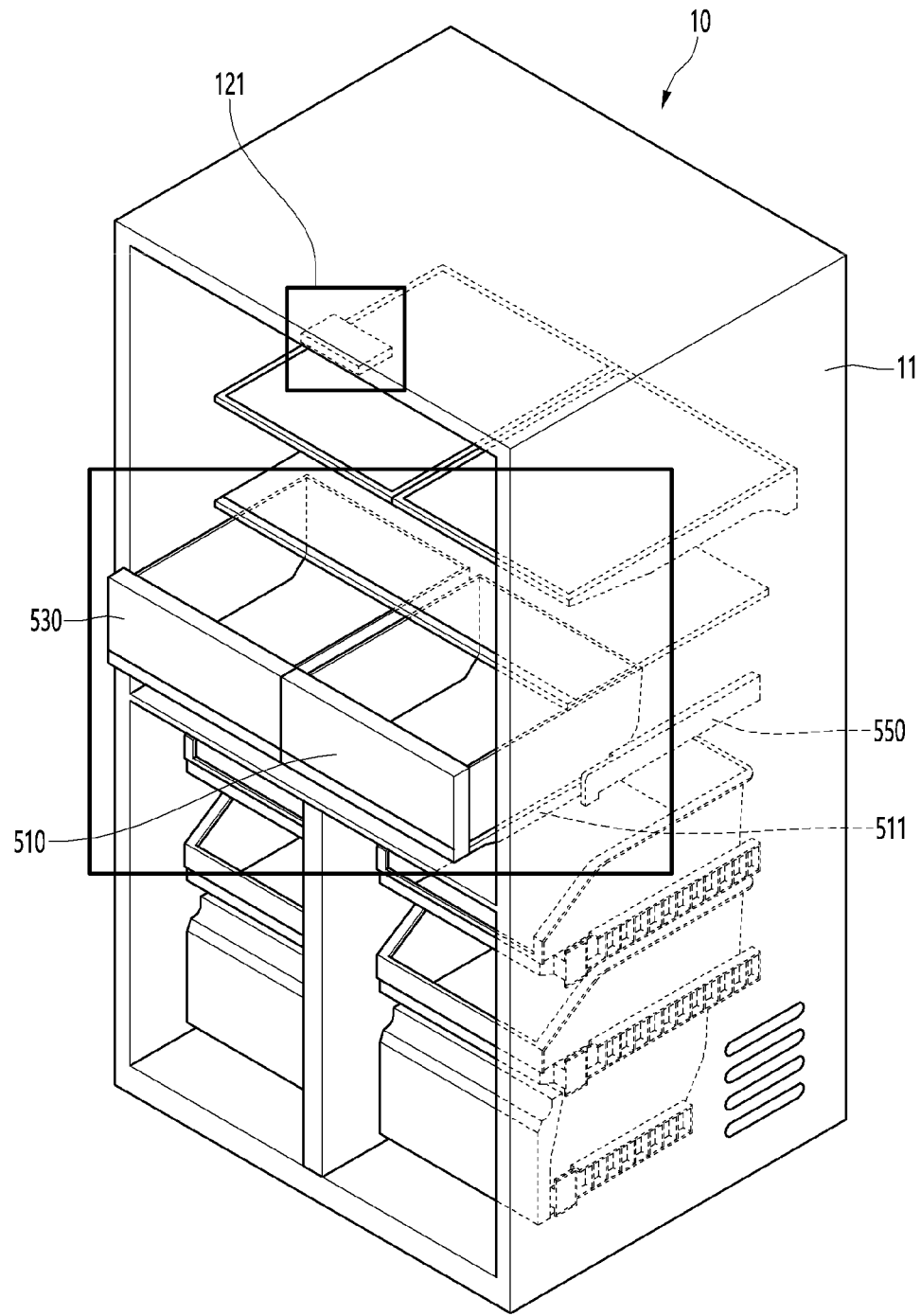
FIGS. 5b to 5d are views for explaining the inside of the refrigerator according to an embodiment of the present invention.
Figure 5C:
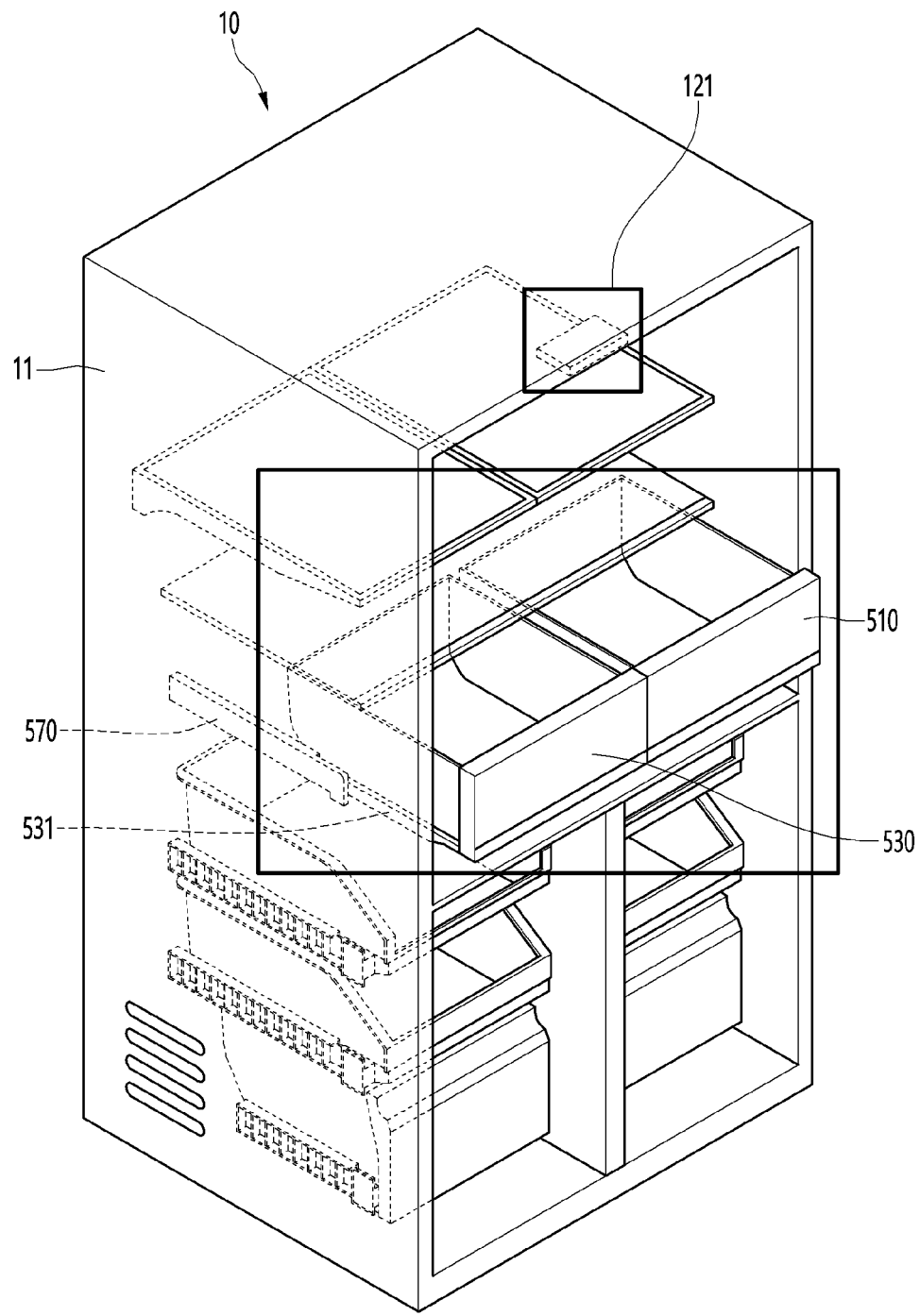
Figure 5D:
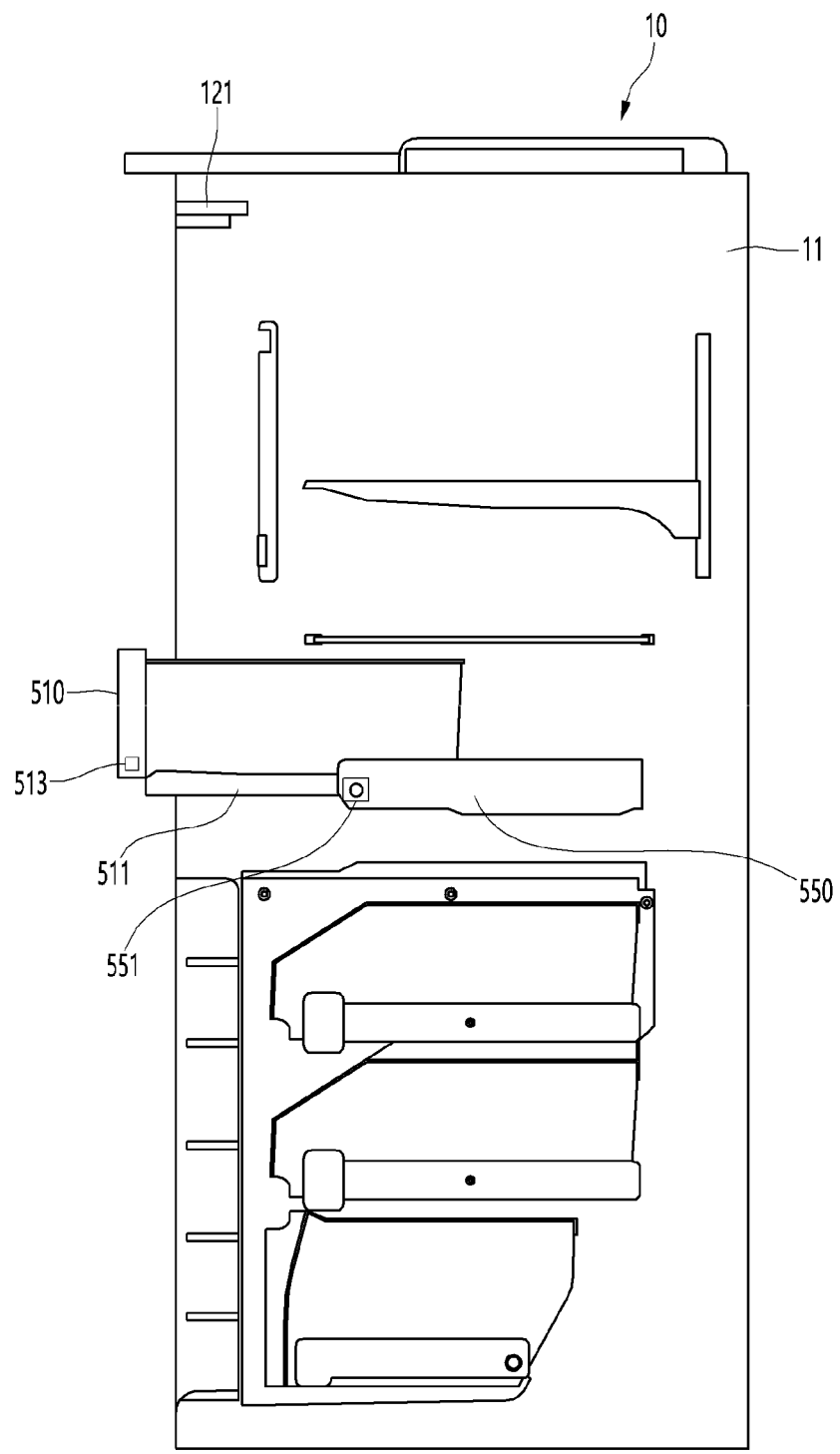

FIG. 5a is a perspective view of a refrigerator according to an embodiment of the present invention, and FIGS. 5b to 5d are views for explaining the inside of the refrigerator according to an embodiment of the present invention.

Referring to FIG. 5a, a refrigerator 10 includes a cabinet 11 having a plurality of storage rooms and doors 12 and 15 provided on a front surface of the cabinet 11 to selectively open and close any one of the plurality of storage rooms.

The plurality of storage rooms may include a refrigerating compartment 18 and a freezing compartment 19.

The doors 12 and 15 may include a refrigerating compartment door 12 rotatably provided in front of the refrigerating compartment 180 and a freezing compartment door 15 rotatably provided in front of the freezing compartment 19.

Cold air generated by an evaporator may be supplied to the refrigerating compartment 18 to cool the inside of the refrigerating compartment 18. The evaporator may be provided behind a rear wall of the refrigerating compartment.

The refrigerator compartment door 12 is provided as a pair and may be rotatably connected to the left and right edges of the front surface of the cabinet 11, respectively.

The refrigerator compartment door 12 may include an inner door 13 that is in close contact with the front surface of the cabinet 11 and an outer door 14 that is rotatably connected to the inner door 13 on the front surface of the inner door 13.

A first hinge 114 may be provided at an upper side of the cabinet 11 so that the refrigerating compartment door 12 is rotatable with respect to the cabinet 11.

One side of the first hinge 114 may be connected to a top surface of the cabinet 11, and the other side of the first hinge 114 may be connected to the inner door 13. The inner door 13 and the outer door 14 may rotate together around the first hinge 114.

The inner door 13 may include a second hinge (not shown) that enables the outer door 14 to rotate with respect to the inner door 13. The outer door 14 may independently rotates around the second hinge, and a front portion of the inner door 13 may be opened by the rotation of the outer door 14.

Referring to FIGS. 5b to 5d, a camera 121 is provided on a ceiling of the cabinet 11 to photograph a lower side. That is, the camera 121 may photograph the inside of the refrigerator 10.

The cabinet 11 may further include a housing (not shown) for accommodating the camera 121.

The camera 121 may be disposed to photograph a downward side in a fixed position.

Some of the plurality of storage rooms provided in the cabinet 11 may include a first storage room 510 and a second storage room 530 to store foods.

The first storage room 510 and the second storage room 530 may be disposed adjacent to each other in a horizontal direction.

Each of the first storage room 510 and the second storage room 530 may be accommodated in the cabinet 11 and have an independent cold air holding space for accommodating the foods therein.

In addition, each of the first storage room 510 and the second storage room 530 may be configured in the form of a drawer inside the cabinet 11. When each of the storage rooms is withdrawn in a front direction of the refrigerator, the inside of the storage room is opened so that a user takes out or checks stored vegetables. When the storage room is withdrawn toward a rear surface of the refrigerator, foods are stored therein.

FIGS. 5b to 5d illustrate a state in which each of the first storage room 510 and the second storage room 530 is partially opened.

Referring to FIG. 5b, the cabinet 11 may include a guide rail 550 that guides movement of the first storage room 510. The guide rails 550 may be provided as a pair.

The first storage room 510 may include a moving bracket 511 slidably coupled to the guide rail 550 in a direction of the front surface of the refrigerator 10. The moving bracket 511 may also be provided as a pair at a lower side of the first storage room 510.

Referring to FIG. 5c, the cabinet 11 may include a guide rail 570 that guides movement of the second storage room 530. The guide rails 570 may be provided as a pair.

The second storage room 530 may include a moving bracket 531 slidably coupled to the guide rail 570 in the direction of the front surface of the refrigerator 10. The moving bracket 531 may also be provided as a pair at a lower side of the second storage room 530.

Referring to FIG. 5d, the guide rail 550 that guides the movement of the first storage room 510 may include a first storage room opening/closing sensor 551 capable of detecting whether the first storage room 510 is opened or closed.

The first storage room opening/closing sensor 551 may include two reed switches.

The first storage room opening/closing sensor 551 may be disposed at one end of ends of the guide rail 550, which is disposed at a position closer to the camera 121.

The first storage room opening/closing sensor 551 may detect whether the first storage room 510 is opened or closed according to movement of the magnet 513 provided at a lower side of the first storage room 510.

A principle of detecting whether the first storage room 510 is opened or closed through the first storage room opening/closing sensor 551 will be described in detail later.

The guide rail that guides the movement of the second storage room 530 may include a second storage room opening/closing sensor capable of detecting whether the second storage room 530 is opened or closed. Similarly, the second storage room opening/closing sensor may also detect whether the second storage room 530 is opened or closed according to movement of a magnet provided at a lower side of the second storage room 530.

Figure 6A:
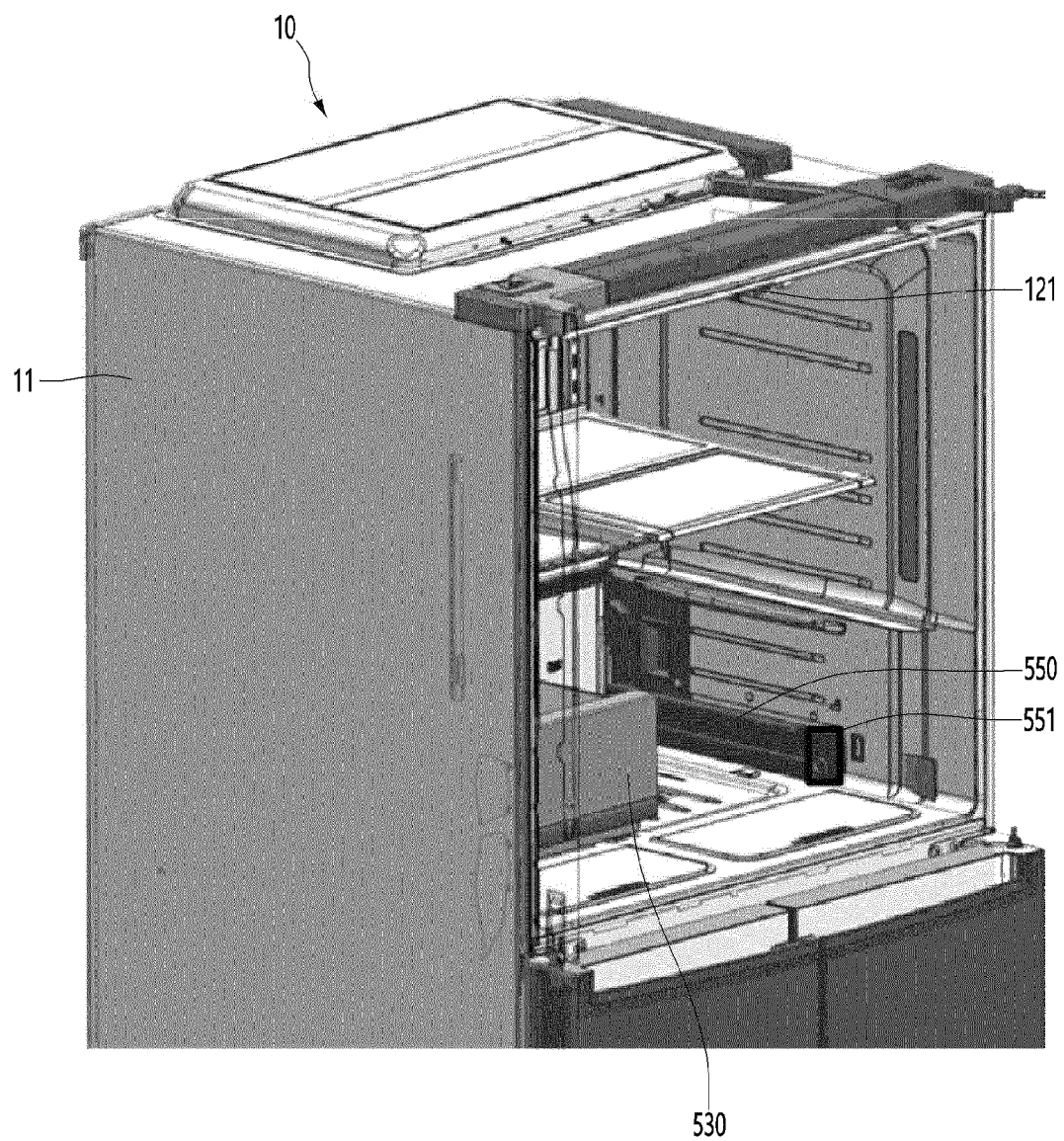
FIG. 6a is a view for explaining an arrangement position of a first storage room opening/closing sensor that detects whether a first storage room is opened or closed according to an embodiment of the present invention.

FIG. 6a is a view for explaining an arrangement position of the first storage room opening/closing sensor that detects whether the first storage room is opened or closed according to an embodiment of the present invention, and FIG. 6a is a view for explaining an arrangement position of the second storage room opening/closing sensor that detects whether the second storage room is opened or closed.

Referring to FIG. 6a, the first storage room opening/closing sensor 551 may be disposed on one end of the guide rail 550. The first storage room opening/closing sensor 551 may detect whether the first storage room 510 is opened or closed by detecting the movement of the magnet provided in the first storage room 510.

Figure 6B:
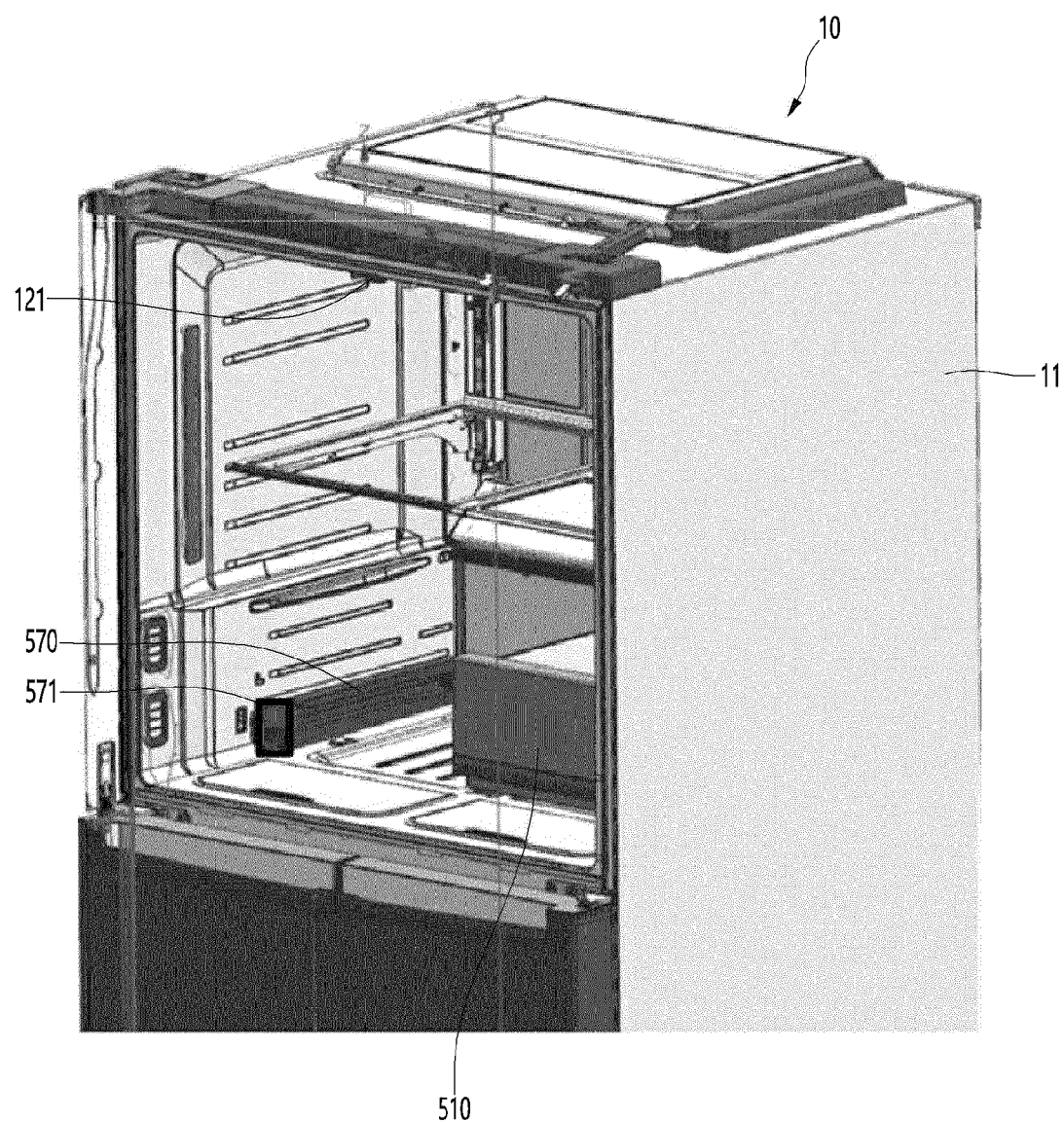
FIG. 6b is a view for explaining an arrangement position of a second storage room opening/closing sensor that detects whether a second storage room is opened or closed.

Referring to FIG. 6b, the second storage room opening/closing sensor 571 may be disposed on one end of the guide rail 570. The second storage room opening/closing sensor 571 may detect whether the second storage room 530 is opened or closed by detecting the movement of the magnet provided in the second storage room 530.

Figure 7A:
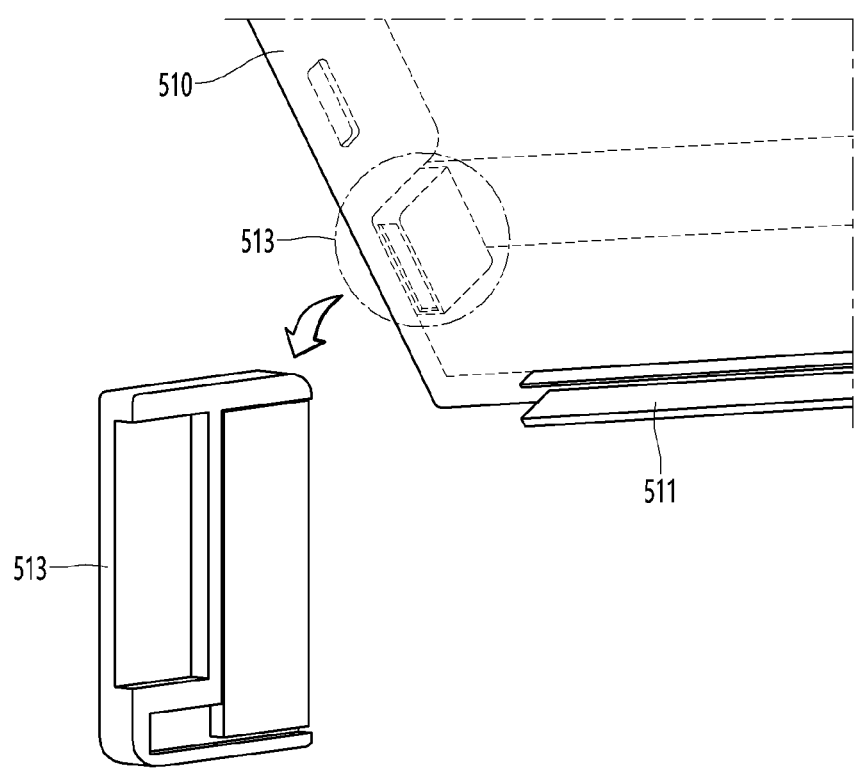
FIG. 7a is a view for explaining an arrangement position of a magnet according to an embodiment of the present invention.
Figure 7B:
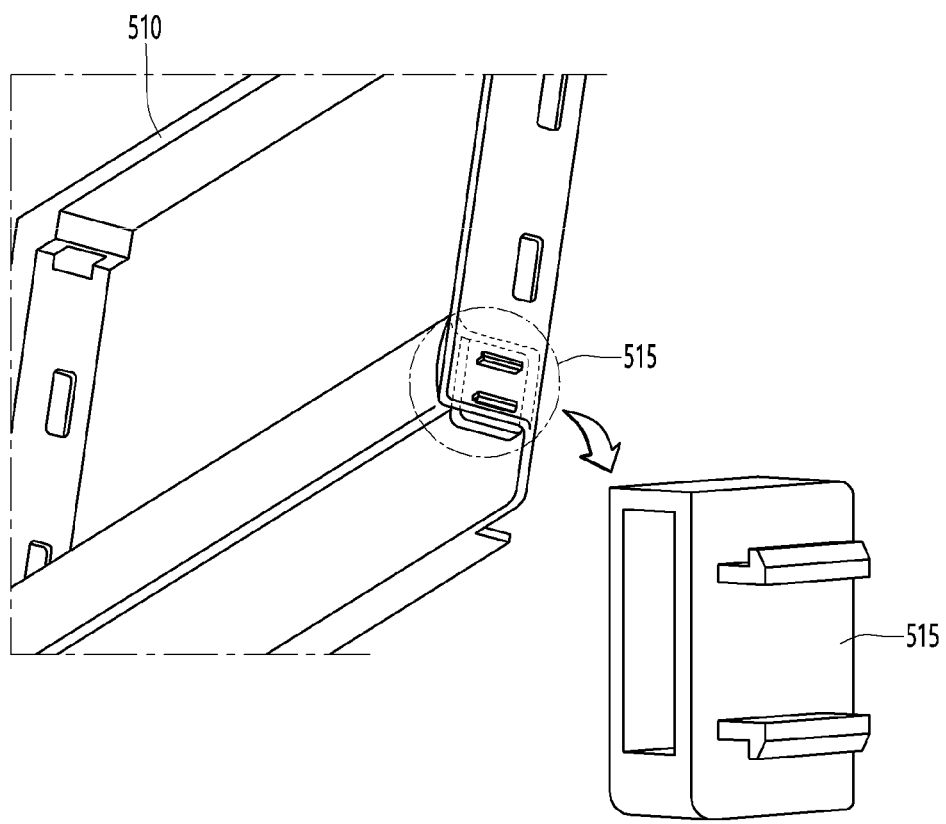
FIG. 7b is a view for explaining a holder coupled to the magnet.

FIG. 7a is a view for explaining an arrangement position of the magnet according to an embodiment of the present invention, and FIG. 7b is a view for explaining a holder coupled to the magnet.

FIGS. 7a and 7b illustrate the magnet 513 and the holder 515 provided in the first storage room 510 as an example, but the embodiment of FIGS. 7a and 7b may also be applied to a magnet and a holder, which are provided in the second storage room 530.

Referring to FIG. 7a, the magnet 513 may be disposed on a lower end of the front surface of the first storage room 510.

The magnet 513 may be disposed above the moving bracket 511.

Referring to FIG. 7b, a holder 515 for fixing the magnet 513 to the first storage room 510 is illustrated. The holder 515 may fix the magnet 513 so that the magnet 513 is not separated from the first storage room 510.

The magnet 513 may move together with the movement of the first storage room 510.

Figure 8A:
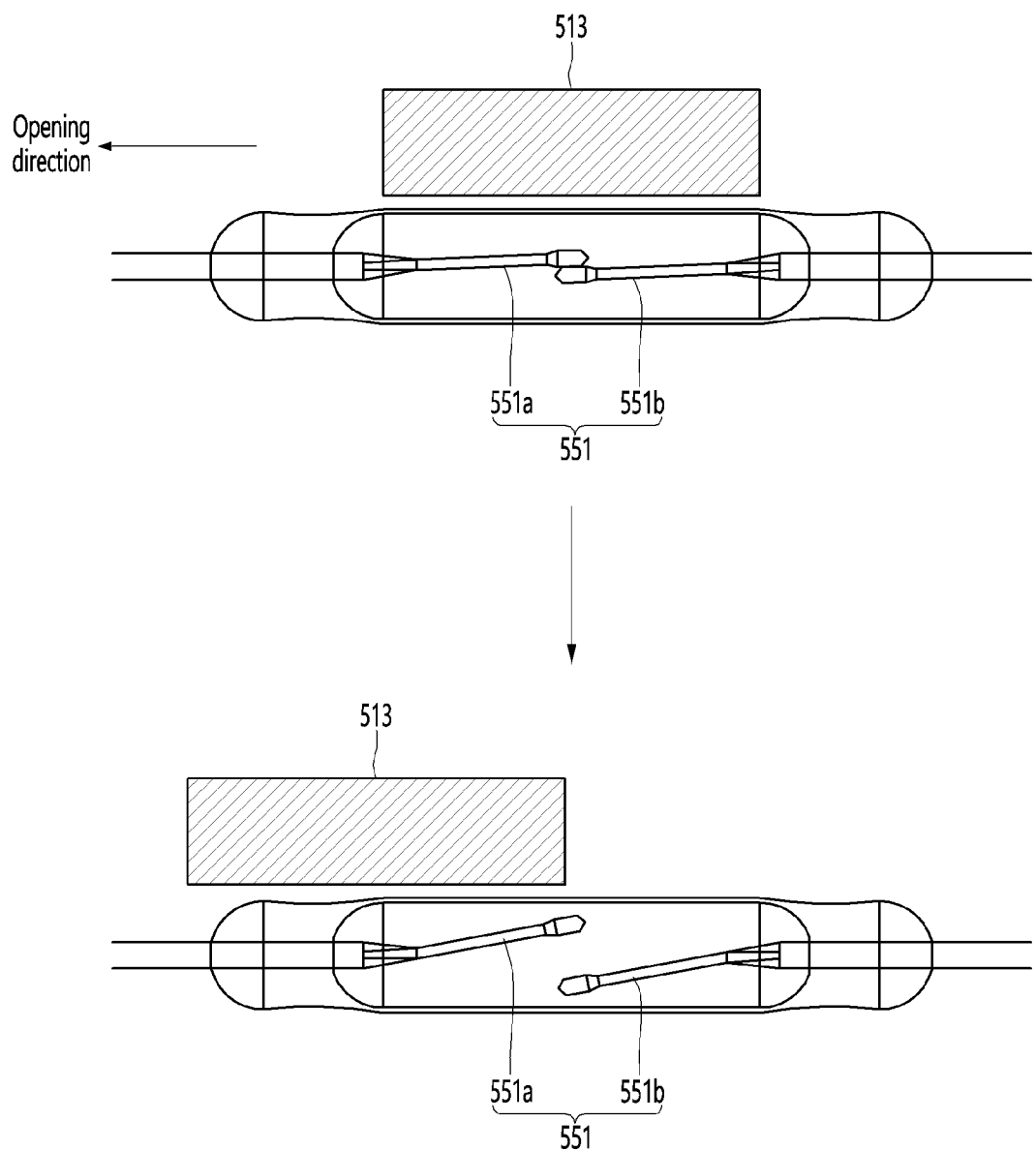
FIGS. 8a and 8b are views for explaining a principle of a storage room opening/closing sensor detecting whether a storage room is opened or closed according to an embodiment of the present invention.
Figure 8B:
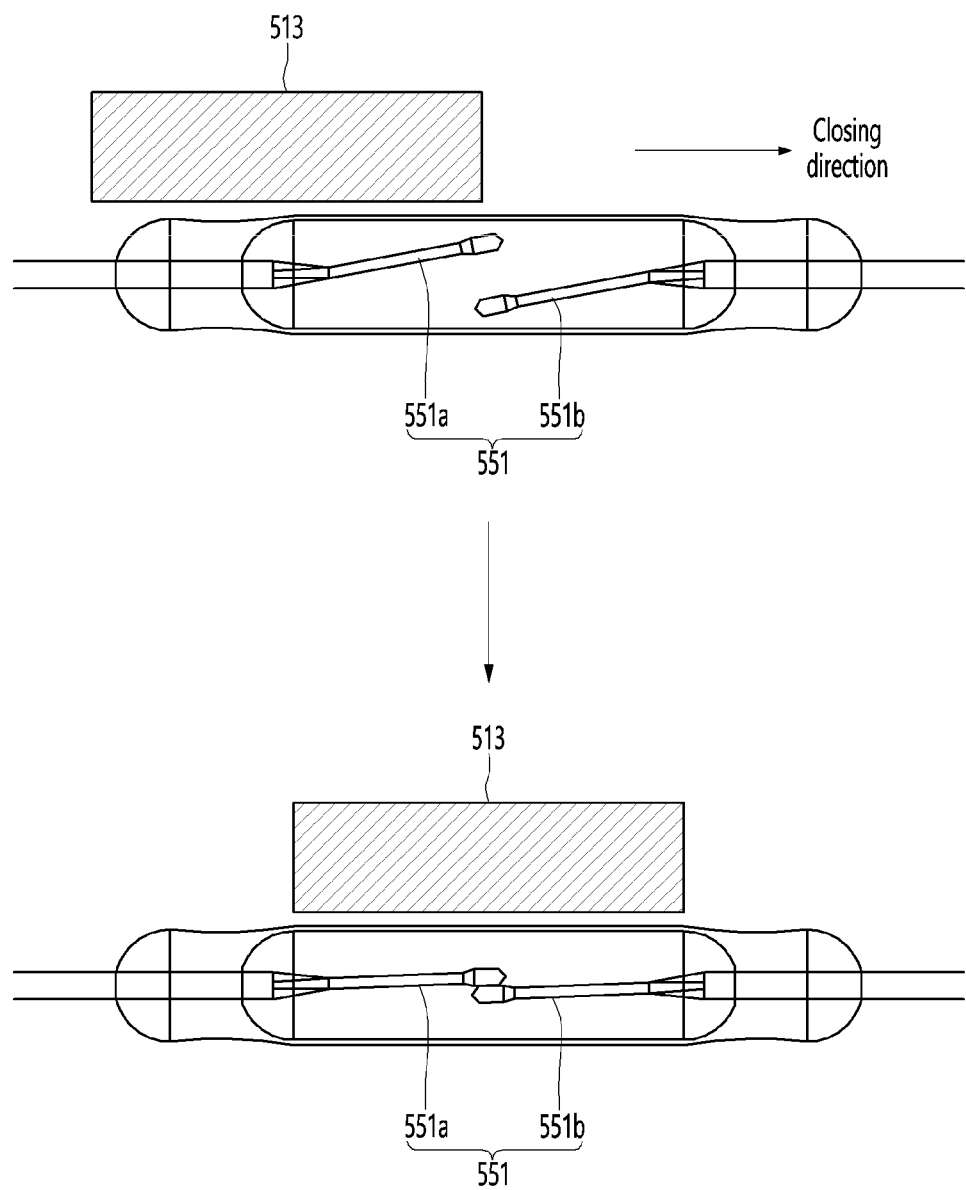

FIGS. 8a and 8b are views for explaining a principle of the storage room opening/closing sensor detecting whether the storage room is opened or closed according to an embodiment of the present invention.

In FIGS. 8a and 8b, although an example in which the first storage room opening/closing sensor 551 detects whether the first storage room 510 is opened or closed by using the magnet 513 provided in the first storage room 510 is described, this embodiment may be applied to a process, in which the second storage room opening/closing sensor 571 detects whether the second storage room 530 is opened or closed by using the magnet provided in the second storage room 530.

In FIGS. 8a and 8b, the first storage room opening/closing sensor 551 may include a first reed switch 551a and a second reed switch 551b.

FIG. 8a is a view for explaining a process in which the first storage room opening/closing sensor 551 detects the opening of the first storage room 510.

Before the first storage room 510 is opened, an end of the first reed switch 551a and an end of the second reed switch 551b are in contact with each other.

When the first storage room 510 is opened in the direction of the front surface of the refrigerator 10, the magnet 513 provided in the first storage room 510 may move in the direction of the front surface of the refrigerator 10.

In this case, the end of the first reed switch 551a and the end of the second reed switch 551b may be spaced apart from each other by magnetic fields according to the movement of the magnet 513.

When the end of the first reed switch 551a and the end of the second reed switch 551b are spaced apart from each other, the first storage room opening/closing sensor 551 may output an off signal. When the first storage room opening/closing sensor 551 outputs the off signal, a processor 180 may determine that the first storage room 510 is opened.

FIG. 8b is a view for explaining a process in which the first storage room opening/closing sensor 551 detects the closing of the first storage room 510.

After the first storage room 510 is opened, the end of the first reed switch 551a and the end of the second reed switch 551b are in a state of being spaced apart from each other.

When the first storage room 510 is closed in a direction of a rear surface of the refrigerator 10, the magnet 513 provided in the first storage room 510 may move in the direction of the rear surface of the refrigerator 10.

In this case, the end of the first reed switch 551a and the end of the second reed switch 551b may be in contact with each other by the magnetic fields according to the movement of the magnet 513.

When the end of the first reed switch 551a and the end of the second reed switch 551b are in contact with each other, the first storage room opening/closing sensor 551 may output an on signal. When the first storage room opening/closing sensor 551 outputs the on signal, the processor 180 may determine that the first storage room 510 is closed.

FIG. 9 is a flowchart illustrating a method for operating a refrigerator according to an embodiment of the present invention.

In FIG. 9, a refrigerator 10 may include all of the components of FIG. 4.

FIG. 9 may be a view for explaining a method for operating the refrigerator 10 to manage foods stored in one or more of a first storage room 510 and a second storage room 530 of the refrigerator 10.

Referring to FIG. 9, a processor 180 of the refrigerator 10 detects that the storage rooms 510 and 530 are opened (S901).

The processor 180 may detect whether the storage rooms 510 and 530 are opened through the storage room opening/closing sensors 551 and 571.

The processor 180 may detect opening of the first storage room 510 through the first storage room opening/closing sensor 551 and may detect opening of the second storage room 530 through the second storage room opening/closing sensor 571.

The storage room opening/closing sensors 551 and 571 may include a pair of reed switches and may detect whether the storage rooms 510 and 530 are opened or closed according to whether ends of the reed switches are in contact with each other.

An embodiment of FIG. 8a may be applied to the process of detecting whether the storage rooms 510 and 530 are opened through the storage room opening/closing sensors 551 and 571.

When the opening of the storage rooms 510 and 530 is detected, the processor 180 transmits a photographing turn-on command for turning on photographing of a camera 121 (S903).

When the opening of the storage rooms 510 and 530 is detected, the processor 180 may transmit a command for turning on an operation of the camera 121 attached to a ceiling of the cabinet 11 to the camera 121.

Thus, the camera 121 may start the photographing and acquire an image of the first storage room 510 or the second storage room 530 in real time.

The processor 180 acquires images of the storage rooms 510 and 530 obtained according to the photographing of the camera 121 (S905).

The processor 180 determines whether a maximum opening time point of each of the storage rooms 510 and 530 or a closing time point of each of the storage rooms 510 and 530 is detected based on processing of the acquired image (S907).

In an embodiment, the processor 180 may detect a time point at which each of the storage rooms 510 and 530 is maximally opened based on the processing of the image photographed by the camera 121.

The processor 180 may acquire a plurality of images (or image frames) corresponding to each of a plurality of time points and may detect a maximum opening time point of each of the storage rooms 510 and 530 or a closing time point of each of the storage rooms 510 and 530 based on the acquired plurality of images.

For example, the processor 180 may acquire an image acquisition time point corresponding to an image having the largest surface area occupied by each of the storage rooms 510 and 530 as the maximum opening time point of the storage rooms 510 and 530 from the photographed storage room image.

This will be described with reference to the following drawings.

Figure 10:
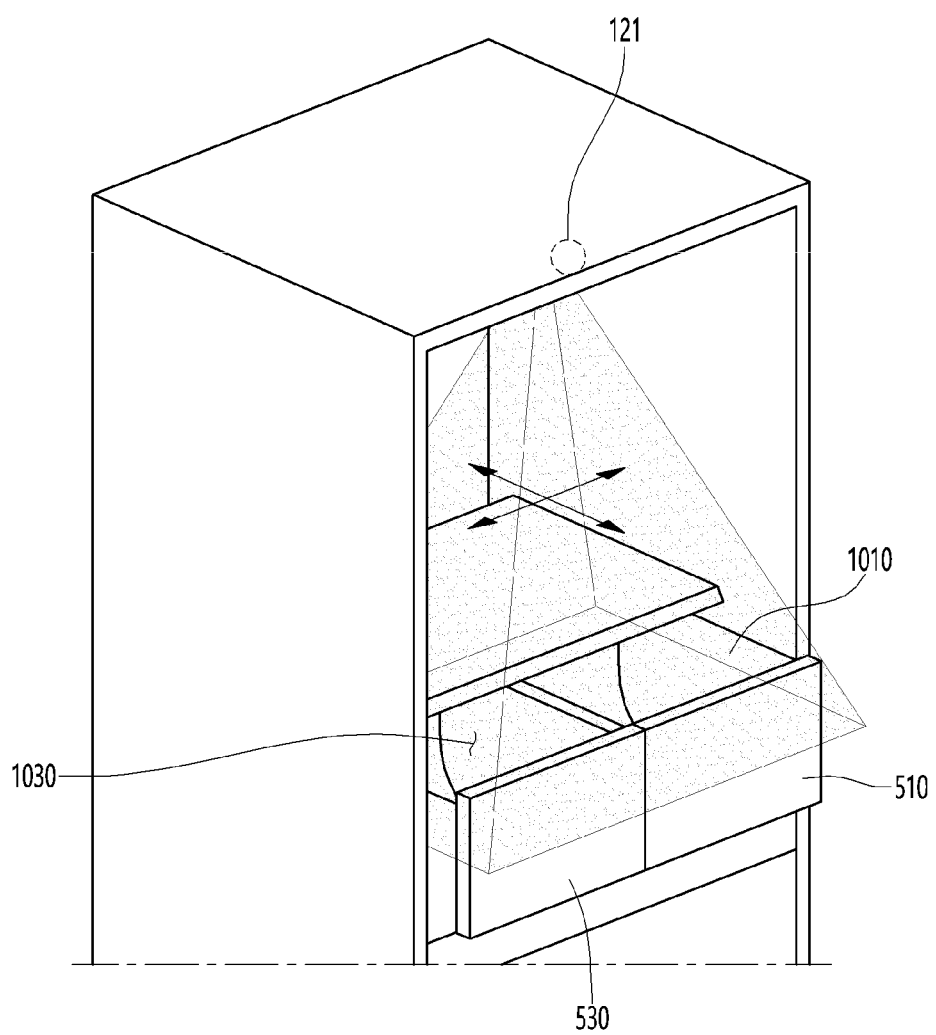
FIG. 10 is a view for explaining an example of acquiring an image of a storage room through a camera according to an embodiment of the present invention.
Figure 11:
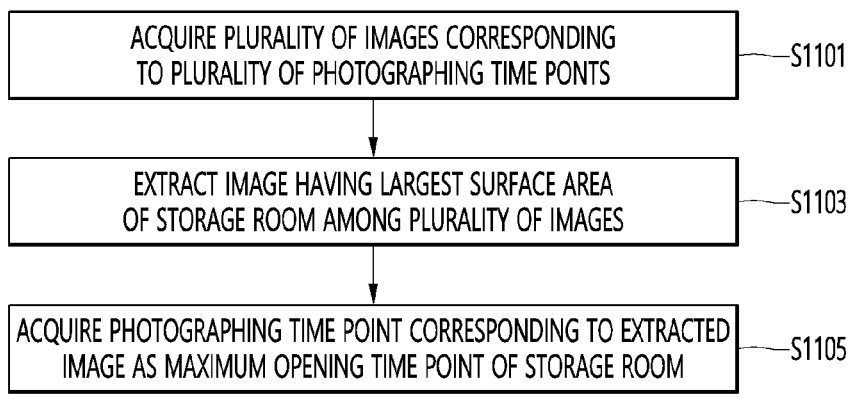
FIGS. 11 and 12 are views for explaining a process of acquiring a maximum opening time point of a storage room based on a plurality of images.
Figure 12:
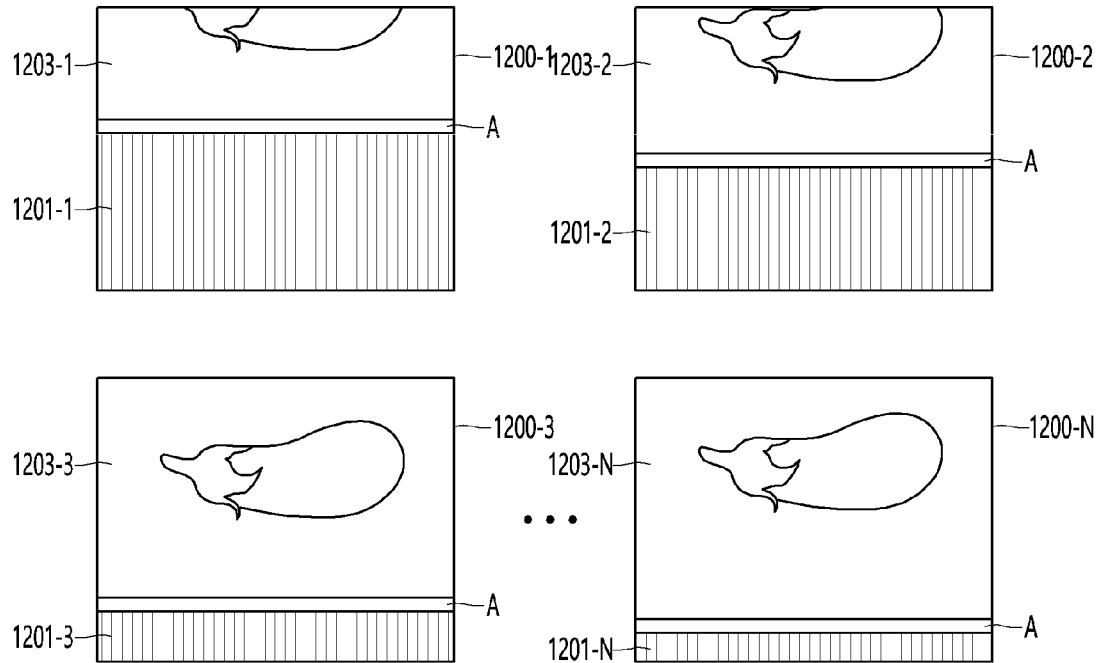

FIG. 10 is a view for explaining an example of acquiring an image of the storage room through the camera according to an embodiment of the present invention, and FIGS. 11 and 12 are views for explaining a process of acquiring the maximum opening time point of the storage room based on a plurality of images.

Referring to FIG. 10, when the opening of the first storage room 510 or the second storage room 530 is detected, the camera 121 may start the photographing.

Particularly, a viewing angle of the camera 121 may be set to photograph foods stored in a first region 1010 in which the first storage room 510 is opened or a region 1030 in which the second storage room 530 is opened.

FIG. 11 is a flowchart illustrating in detail a process of operation S907 of FIG. 9, in which the maximum opening time point of each of the storage rooms 510 and 530 is extracted based on images photographed by the camera 121.

Referring to FIG. 11, after the opening of the storage rooms 510 and 530 is sensed, the processor 180 acquires a plurality of images respectively corresponding to a plurality of photographing time points through the camera 121 (S1101).

The processor 180 extracts an image having the largest surface area of each of the storage rooms 510 and 530 from the plurality of images (S1103).

A surface area of each of the storage rooms 510 and 530 may be a surface area of the storage space of each of the storage rooms 510 and 530, and the surface area of each of the storage rooms 510 and 530 may be maximized in a state in which the storage space of each of the storage rooms 510 and 530 is maximally exposed to the outside.

The processor 180 acquires a photographing time pint corresponding to the extracted image as the maximum opening time point of each of the storage rooms 510 and 530 (S1105).

The processor 180 may recognize an area occupied by each of the storage rooms 510 and 530 among the plurality of images photographed within a predetermined time and extract an image having the largest surface area of the recognized area. This will be described with reference to FIG. 12.

Referring to FIG. 12, N images 1200-1 to 1200-N corresponding to the first storage room 510 acquired through the camera 121 are illustrated.

Since the camera 121 performs photographing at a fixed position, the image may have the same size.

The processor 180 may delete an area below a boundary area A based on the boundary area A of the first storage room 510 and acquire a remaining areas.

The processor 180 may store an image of the boundary area A of the first storage room 510 in advance in a memory 170.

The processor 180 may recognize the boundary area A by comparing the image of the boundary area A stored in the memory 170 to the obtained image.

As another example, the processor 180 may recognize the boundary area A by recognizing a marker attached to the boundary area A.

The processor 180 may recognize the boundary area A included in a first image 1200-1, delete a first lower area 1201-1 of the boundary area A, and acquire a first remaining area 1203-1.

Also, the processor 180 may recognize the boundary area A included in a second image 1200-2, delete a second lower area 1201-2 of the boundary area A, and acquire a second remaining area 1203-2.

The processor 180 may recognize the boundary area A included in a third image 1200-3, delete a third lower area 1201-3 of the boundary area A, and acquire a third remaining area 1203-3.

In this way, the processor 180 may recognize the boundary area A included in an N-th image 1200-N, delete an N-th lower area 1201-N of the boundary area A, and acquire an N-th remaining area 1203-N.

The processor 180 may extract an image corresponding to an area having the largest surface area among the first to N-th remaining areas 1203-1 to 1203-N.

The processor 180 may acquire a photographing time point of the extracted image as the maximum opening time point of the first storage room 510.

Assuming that a surface area of the N-th remaining area 1203-N is the largest, the photographing time point of the N-th image 1200-N may be the maximum opening time point of the first storage room 510.

The maximum opening time point of the first storage room 510 may be detected by an AI server 200.

That is, the processor 180 may transmit a plurality of photographed images to the AI server 200. The AI server 200 may acquire the maximum opening time point of the first storage room 510 in the same manner as in the embodiment of FIG. 12 with respect to the plurality of images received from the refrigerator 200 and transmit the acquired maximum opening time point to the refrigerator 100.

As described above, according to an embodiment of the present invention, since food recognition is performed based on the time point at which the storage space of the storage room is maximally exposed through the image processing, the food storage state of the storage room may be accurately recognized.

FIG. 9 will be described again.

The processor 180 may detect a time point at which the storage rooms 510 and 530 are closed based on the switching in the movement direction of each of the storage rooms 510 and 530.

This will be described with reference to the following accompanying drawings.

Figure 13:
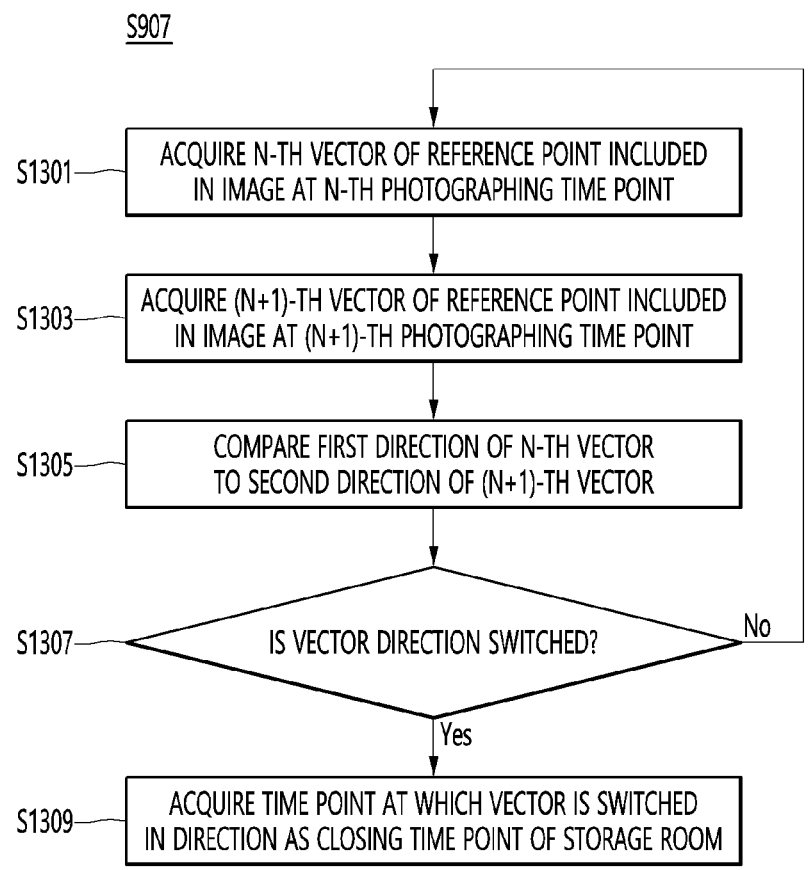
FIGS. 13 and 14 are views for explaining a process of detecting a closing time point of the storage room based on an image photographed by a camera according to an embodiment of the present invention.
Figure 14:
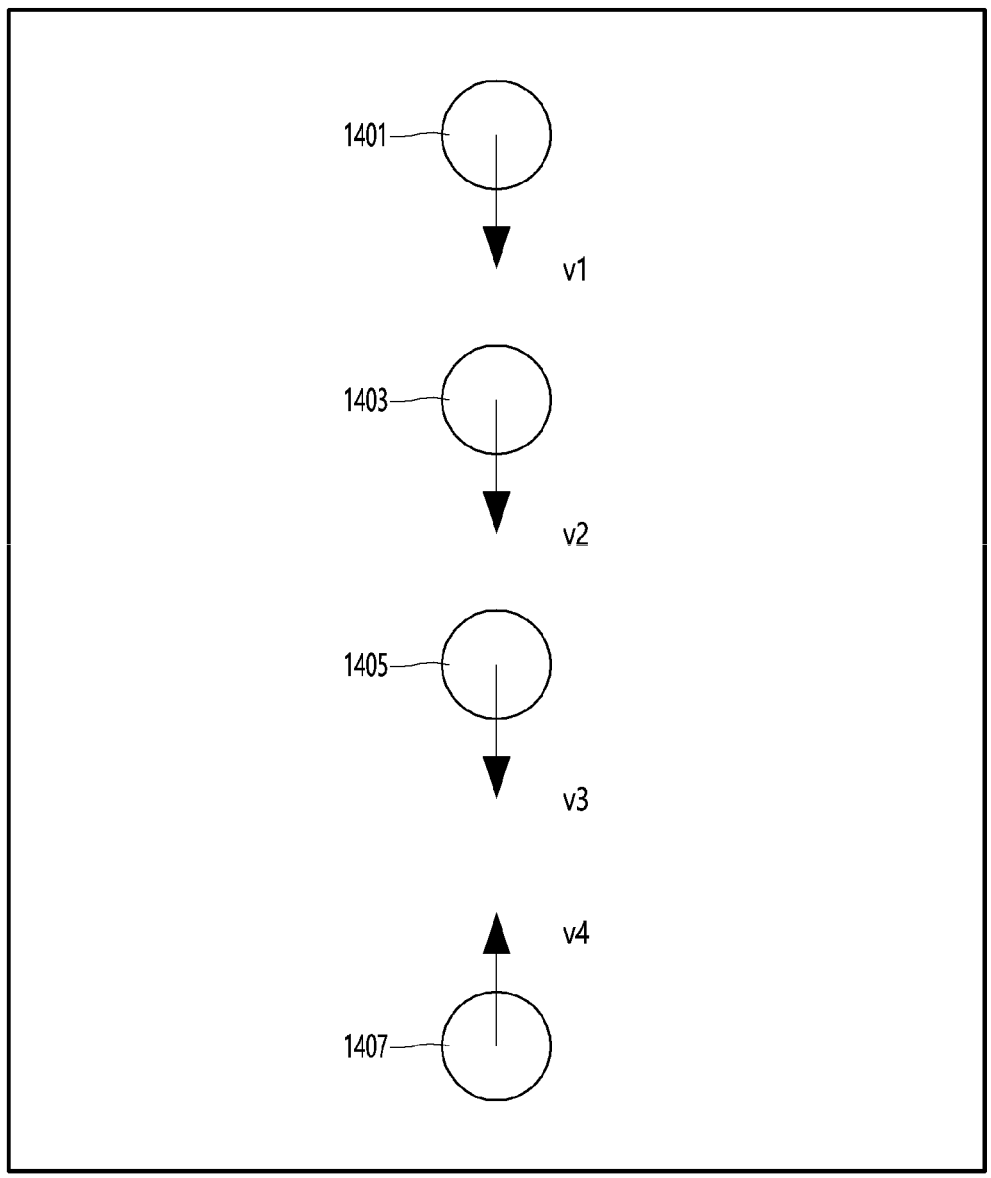

FIGS. 13 and 14 are views for explaining a process of detecting the closing time point of the storage room based on an image photographed by the camera according to an embodiment of the present invention.

The processor 180 may detect the closing time pint of the storage room by using an optical flow technique.

The optical flow technique is a technique for identifying a moving pattern of an object that occurs due to movement of an object from successive image frames.

FIG. 13 is a flowchart illustrating in detail a process of operation S907 of FIG. 9, in which the maximum opening time point of each of the storage rooms 510 and 530 is extracted based on images photographed by the camera 121.

Referring to FIG. 13, the processor 180 acquires an N-th vector of a reference point included in an image of an N-th photographing time point (S1301).

The reference point may be a point corresponding to a point in the boundary area A of FIG. 12. One point of the boundary area A may be a point at which the marker attached to the boundary area A is disposed, but this is merely an example, and the reference point may be a point of a specific object.

The processor 180 acquires an (N+1)-th vector of a reference point included in an image of an (N+1)-th photographing time point (S1303).

The processor 180 may acquire the (N+1)-th vector at the (N+1)-th photographing time point following the N-th photographing time point from the reference point indicating the same point.

The processor 180 compares a first direction of the N-th vector to a second direction of the (N+1)-th vector (S1305).

The first direction may be a direction in which the storage rooms 510 and 530 are opened.

The second direction may be any one of a direction in which the storage rooms 510 and 530 are opened or a direction in which the storage rooms 510 and 530 are closed.

The direction in which the storage rooms 510 and 530 are opened may be the direction of the front surface of the refrigerator 10, and the direction in which the storage rooms 510 and 530 are closed may be the direction of the rear surface of the refrigerator 10.

As a result of the comparison, the processor 180 determines whether the direction of the vector is switched (S1307).

When the first direction and the second direction are the same, the processor 180 may determine that the direction of the vector is not switched.

When the first direction and the second direction are opposite to each other, the processor 180 may determine that the direction of the vector is switched.

When the first direction is an opening direction of the storage rooms 510 and 530, the second direction may be a closing direction of the storage rooms 510 and 530.

When the direction of the vector is switched, the processor 180 acquires a time point at which the direction of the vector is switched as a time point at which the storage rooms 510 and 530 are closed (S1309).

When the directions of the vectors are different from each other, the processor 180 may detect that the moving direction of each of the storage rooms 510 and 530 is switched from the opening direction to the closing direction.

The processor 180 may acquire a time point at which the switching in moving direction of the storage rooms 510 and 530 is detected as the closing time point of each of the storage rooms 510 and 530.

Referring to FIG. 14, reference points 1401 to 1407 acquired from each of time-variable four image frames are illustrated.

A direction of each of the first to third reference points 1401 to 1405 may be a direction in which each of the storage rooms 510 and 530 is opened in a first direction.

A fourth reference point 1407 may be a direction in which each of the storage rooms 510 and 530 is closed in a second direction opposite to the first direction.

The processor 180 may acquire a photographing time point of the image frame corresponding to the fourth reference point 1407 as the closing time point of each of the storage rooms 510 and 530.

As described above, according to an embodiment of the present invention, it is possible to automatically acquire an optimal image of the storage space of the storage room by detecting the time point at which the moving direction of the storage room is switched.

Operation S1301 to S1309 may be performed by the AI server 200. For this, the refrigerator 10 may transmit a plurality of image frames acquired through the camera 121 to the AI server 200. The AI server 200 may acquire the closing time point of each of the storage rooms 510 and 530 by performing the operations S1301 to S1309 and transmit the acquired closing time point to the refrigerator 10.

FIG. 9 will be described again.

When there is no change in image of the storage rooms 510 and 530 for a predetermined period of time, the processor 180 may determine a time point immediately after a predetermined time elapses as the maximum opening time of each of the storage rooms 510 and 530.

The processor 180 may determine whether there is no change in image of the storage rooms 510 and 530 for a predetermined period of time by using the change in direction of the vector with respect to the reference point of each image frame.

When the maximum opening time point of each of the storage rooms 510 and 530 or the closing time point of each of the storage rooms is detected, the processor 180 transmits a capture command to the camera 121 (S909).

When the maximum opening time point of each of the storage rooms 510 and 530 or the closing time point of each of the storage rooms is detected, the processor 180 may transmit the capture command to the camera 121 to recognize foods stored in the storage rooms 510 and 530 through the image of the corresponding time point.

The processor 180 acquires a food storage state of the storage room based on the image photographed by the camera 121 according to the capture command (S911).

The processor 180 may recognize a plurality of foods included in the photographed image by using an image recognition model.

The processor 180 may acquire the food storage state based on information on the plurality of recognized foods. The food storage state may include information on the type, location, and number of each of the plurality of foods provided in each of the first storage room 510 and the second storage room 530.

The image recognition model may be an artificial neural network-based model trained through a deep learning algorithm or a machine learning algorithm.

The image recognition model may include an object detection model and an object identification model.

The object detection model may be a model for detecting one or more objects from image data, and the object identification model may be a model for identifying which one or more detected objects are.

The object detection model may be an artificial neural network based model trained by a deep learning algorithm or a machine learning algorithm.

The object detection model may be a model that is trained by the learning processor 130 of the artificial intelligence device 100 and stored in the memory 170.

For another example, the object detection model may be a model trained by the learning processor 240 of the AI server 200 and transmitted from the AI server 200 to the artificial intelligence device 100.

An example of detecting the plurality of objects from the image using the object detection model will be described with reference to the following drawings.

The object may be foods.

Figure 15:
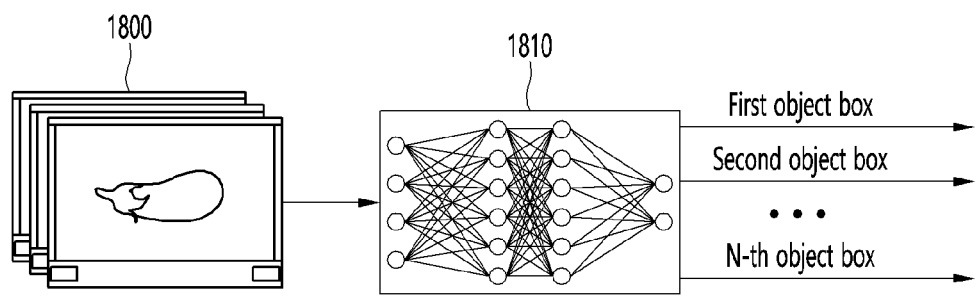
FIGS. 15 and 16 are views for explaining a process of learning an object detection model according to an embodiment of the present disclosure.
Figure 16:
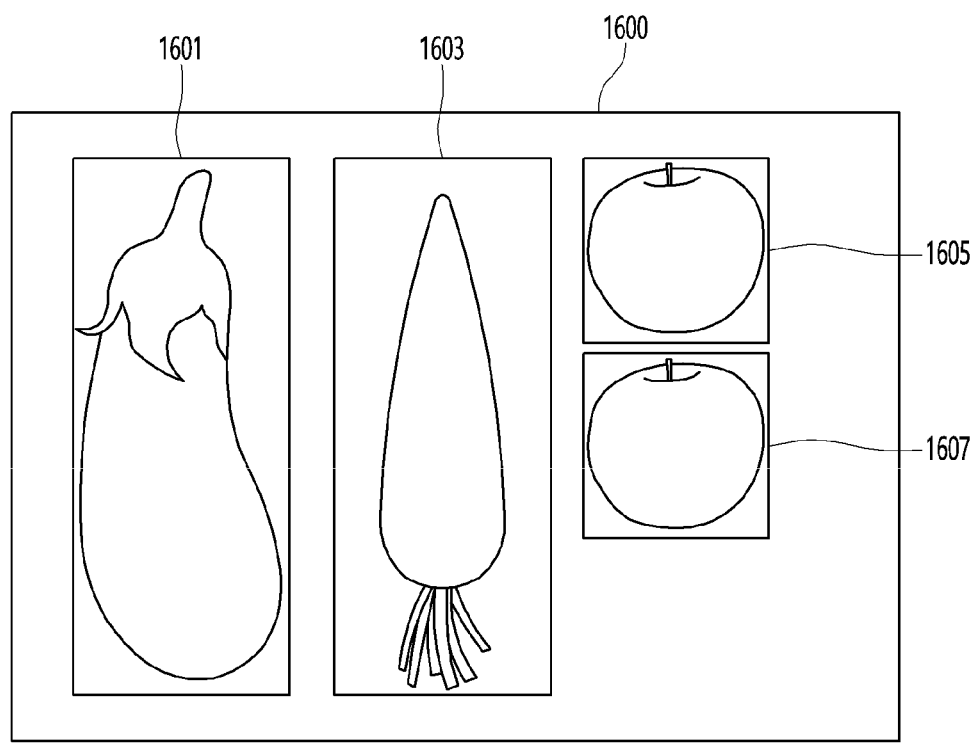

FIGS. 15 and 16 are views for explaining a process of learning the object detection model according to an embodiment of the present disclosure.

Referring to FIG. 15, the object detection model 1510 uses a training image data set 1500 including a plurality of image data and acquires an object bounding box set including a plurality of objects from each training image data.

The object bounding box set may be a set of bounding boxes containing an object.

The object detection model 1510 may detect a plurality of objects from image data by using single shot multibox detector (SSD) MobilenetV2, faster R-CNN inception, and you only look once (YOLO) algorithms.

The YOLO (you only look once) algorithm may be constituted by a plurality of CNNs.

The YOLO (you only look once) algorithm may include a grid division process, a prediction process, a reliability calculation process, and an object selection process.

The grid division process may be a process of dividing the image data 1900 into a plurality of grids. The plurality of grids may be the same size.

The prediction process may be a process of predicting the number of bounding boxes designated in a predefined shape with respect to a center of the grid for each grid.

The bounding box designated as a predefined shape may be generated from data by the K-average algorithm and may contain dictionary information on the size and shape of the object.

Each of the bounding boxes may be designed to detect objects having different sizes and shapes.

Each of the bounding boxes may represent a shape or boundary of the object.

The reliability calculation process may be a process of calculating reliability of the bounding box according to whether the object is included in each of the obtained bounding boxes or only the background is alone.

The object determination process may be a process of determining that an object exists in a bounding box having reliability equal to or greater than a preset value according to the reliability calculation process.

The plurality of bounding boxes 1601 to 1607 included in the image data 1600 may be extracted through the object determination process.

The processor 180 may acquire identification information of each of the objects from the plurality of bounding boxes extracted through the object detection model 1500.

The processor 180 may identify an object existing in the bounding box from the image data corresponding to each of the bounding boxes using the object identification model.

The object identification model may be a learned artificial neural network based model using the deep learning algorithm or the machine learning algorithm.

The object identification model may be a model learned through supervised learning.

The object identification model may be a model for inferring identification information of the object from image data. The identification information of the object may be information for identifying the object such as a name of the object, an identifier of the object, and the like.

The object identification model may be a model that outputs identification information of the object using training data sets including the training image data and labeling data labeled in the training image data as input data.

Figure 17:
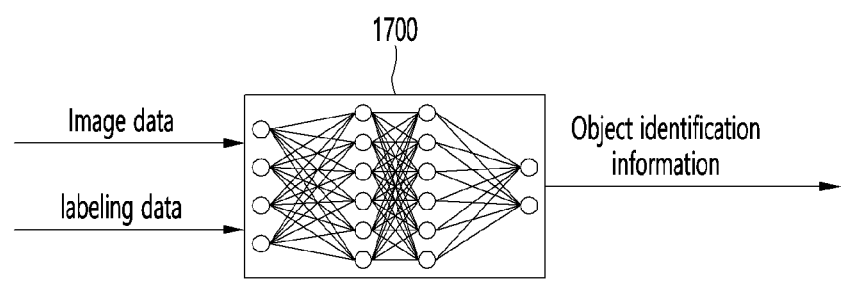
FIG. 17 is a view illustrating a process of training an object identification model according to an embodiment of the present disclosure.

FIG. 17 is a view illustrating a process of training an object identification model according to an embodiment.

Referring to FIG. 17, the object identification model 1700 may infer object identification information using the training data set including the training image data and the labeling data labeled thereon.

The labeling data is correct answer data and may be object identification information.

The object identification model 1700 may be trained to minimize a cost function corresponding to a difference between the labeling data and the object identification information.

The cost function of the object identification model 1700 may be expressed as a squared mean of a difference between the label for the object identification information corresponding to each image data and the object identification information inferred from each image data.

When an input feature vector is extracted from the training image data and is input, the object identification result is output as a target feature vector, and the object identification model 1700 is learned to minimize a loss function corresponding to a difference between the output target feature vector and the labeled object identification information.

The object identification model 1700 may be trained by a learning processor 130 of the refrigerator 10 or a learning processor 240 of the AI server 200 and mounted on the refrigerator 10.

The object identification model 1700 may determine first object identification information from first image data corresponding to the first bounding box 1601 illustrated in FIG. 16. For example, the first object identification information may be an eggplant.

The object identification model 1700 may determine second object identification information from second image data corresponding to the second bounding box 1603. For example, the second object identification information may be a carrot.

As described above, what kind of food the object is may be identified from the image data through the object identification model 1700.

FIG. 9 will be described again.

A position of the food may be acquired through a position of the object bounding box detected through the object detection model 1500. That is, coordinates of the object bounding box may be the position of the food.

The processor 180 displays food management information through the display 151 based on the acquired food storage state (S913).

The food management information may include one or more of a name of the food provided in each of the plurality of storage rooms, the number of foods, a storage period of the food, information on the change in stock of the food, purchase linkage information due to the stock of the food, and recipe information.

The plurality of storage rooms may include a first storage room 510, a second storage room 530, an inner door 13, and an outer door 14.

That is, a storage space for accommodating foods may be provided in each of the inner door 13 and the outer door 14.

The stock change information may be information indicating that the stock of the food provided in the storage room is changed.

The purchase linkage information may indicate site information for purchasing a specific food according to the stock status of the food.

The recipe information may be information indicating a recipe for a dish capable of being cooked using the foods provided in the storage room.

The processor 180 may output food management information through a transparent display provided on the outer door 14.

Hereinafter, the food management information output when a user stores or removes foods into/from the first storage room 510 or the second storage room 530 will be described.

Figure 18:
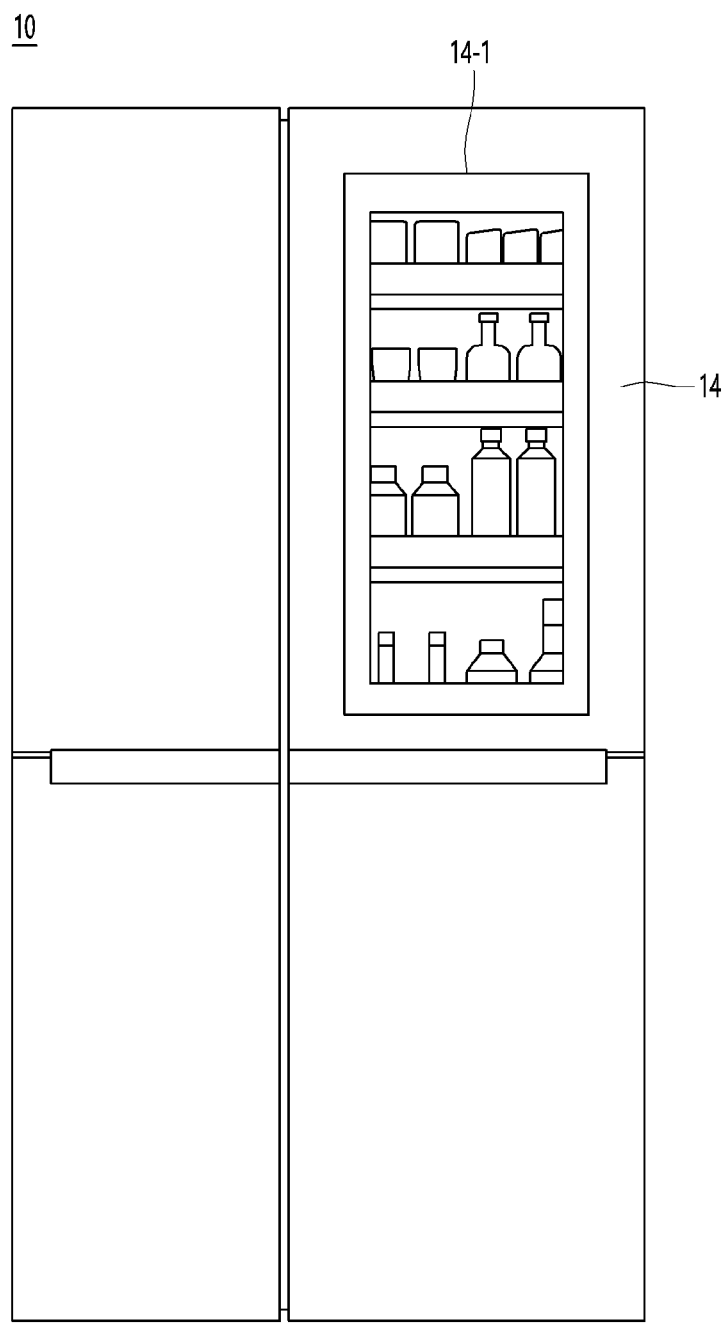
FIG. 18 is a front view of the refrigerator in a state in which an outer door of the refrigerator closed.

FIG. 18 is a front view of the refrigerator in a state in which the outer door of the refrigerator closed.

That is, FIG. 19 illustrates a state in which both the inner door 13 and the outer door 14 are closed.

A transparent display 14-1 may be provided on a front surface of the outer door 14 of the refrigerator 10. The user may view foods stored in the refrigerator compartment through the transparent display 14-1.

The transparent display 14-1 may display information about the foods stored in the refrigerator 10.

The transparent display 14-1 may display a food storage state or food management information.

FIGS. 19*a* to 19*h* are views for explaining a process of displaying the food management information on the transparent display and providing the recipe information related to the stored foods when the foods are stored in the storage room of the refrigerator according to an embodiment of the present invention.

Figure 19A:
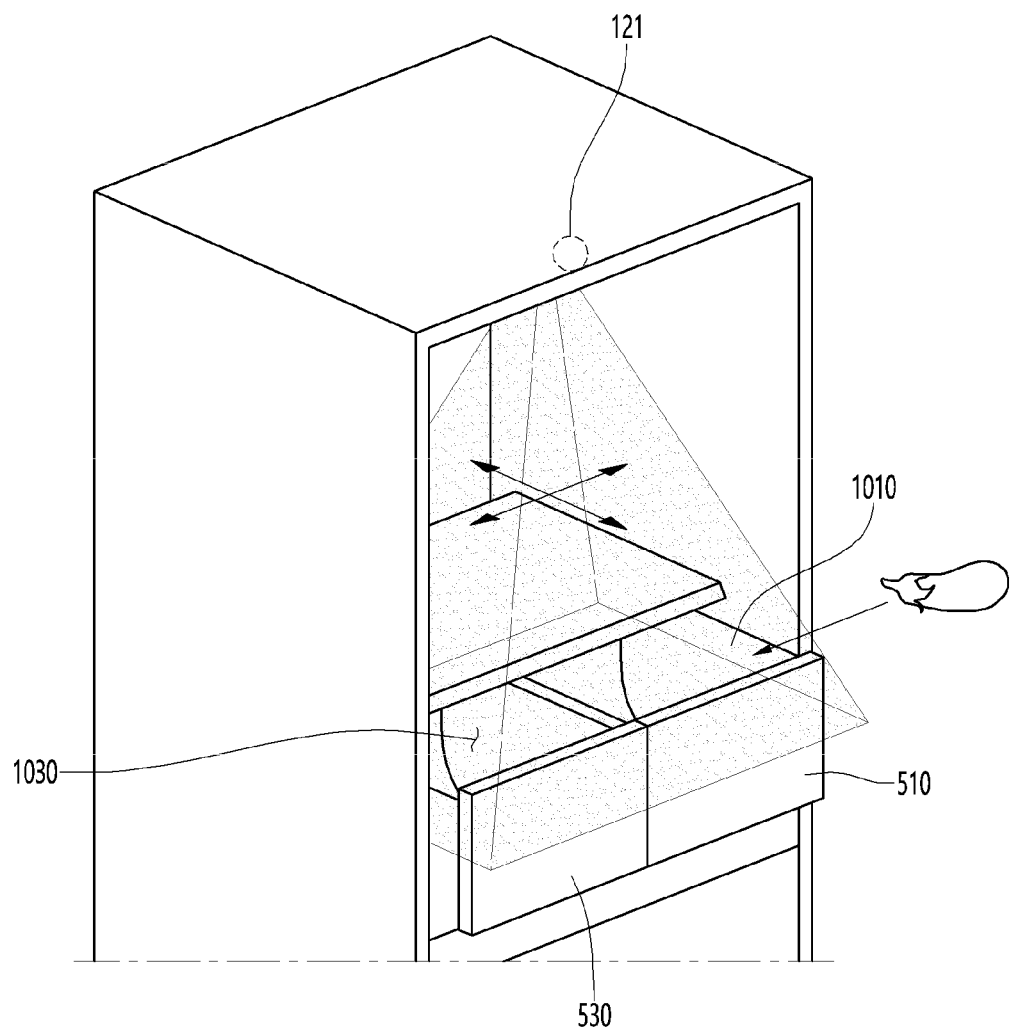

Referring to FIG. 19*a*, the user stores one eggplant in the storage space 1010 of the first storage room 510 provided in the refrigerator 10. It is assumed that the first storage room 510 is a vegetable compartment capable of accommodating vegetables.

The refrigerator 10 may detect that the first storage room 510 is opened, and acquire either a maximum opening time point of the first storage room 510 or a closing time point of the first storage room 510 according to switching in moving direction.

The refrigerator 10 may transmit a capture command to the camera 121 at the acquired time point and may acquire an image of the first storage room 510 photographed by the camera 121.

The refrigerator 10 may acquire a food storage state for foods stored in the storage space 1010 of the first storage room 510 based on the acquired image.

The refrigerator 10 may display the food storage state or food management information based on the food storage state on the transparent display 14-1.

Figure 19B:
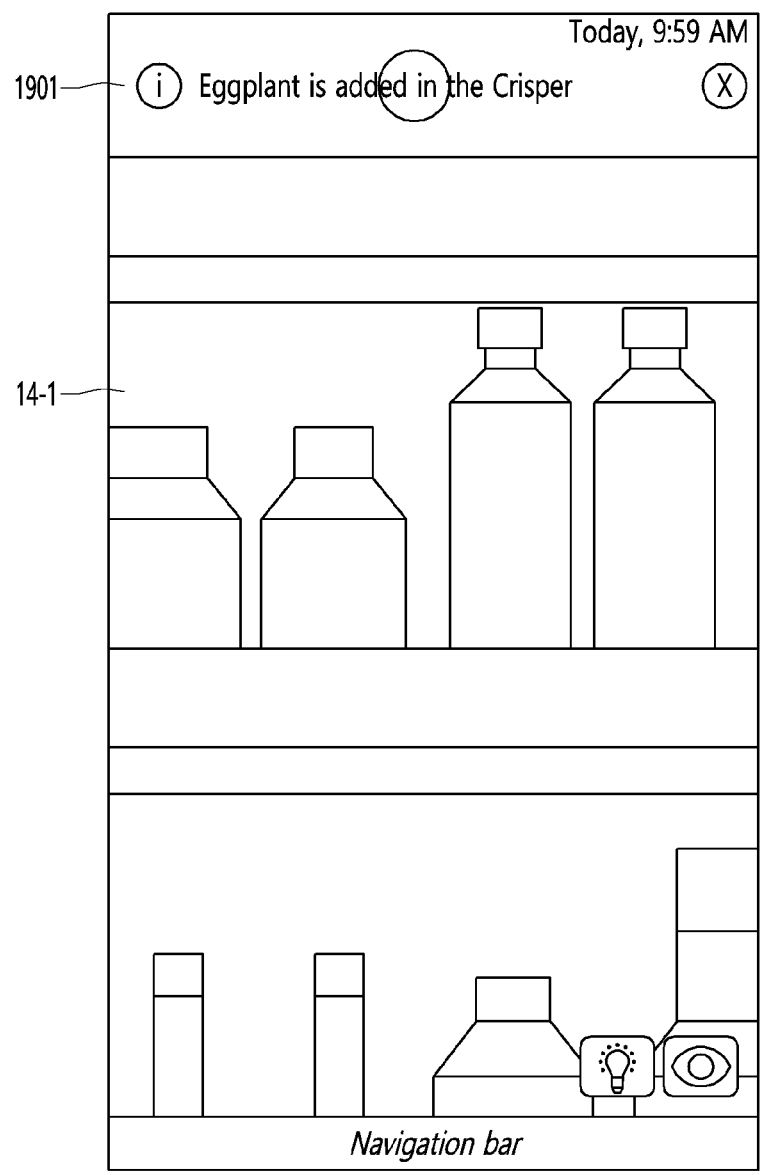

Referring to FIG. 19*b*, after the eggplant is accommodated in the first storage room 510, the eggplant may be recognized through a food recognition process.

The refrigerator 10 may display a notification message 1901 indicating that the eggplant has been put into the first storage room 510 on the transparent display 14-1.

That is, the notification message 1901 may display a message indicating which food is put into which storage room in text form.

Figure 19C:
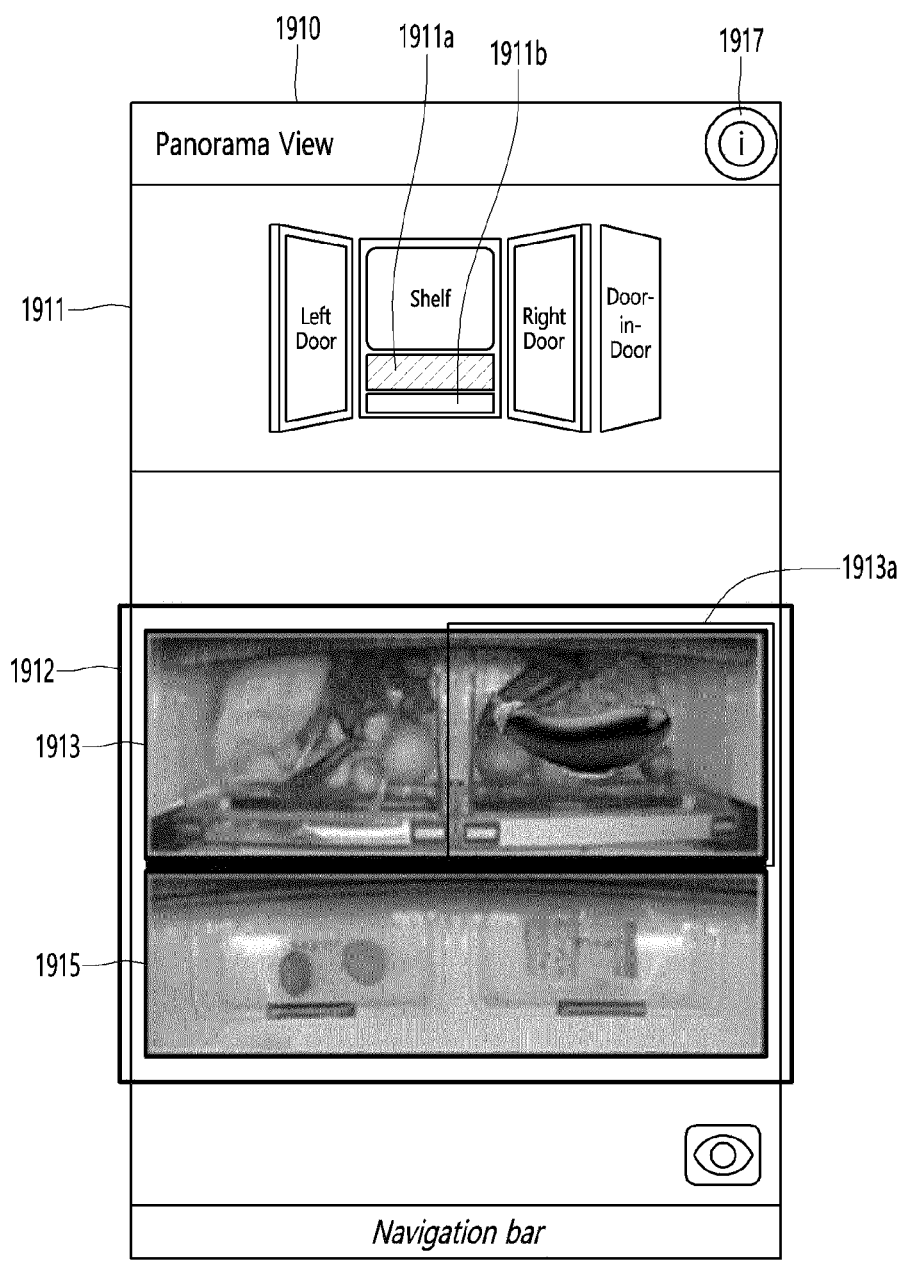

When an input for selecting the notification message 1901 is received, the refrigerator 10 may display a panoramic view screen 1910 on the transparent display 14-1 as illustrated in FIG. 19*c*.

The panoramic view screen 1910 may be a screen including images acquired by photographing a storage state of some storage rooms among the plurality of storage rooms through the camera 121.

The panoramic view screen 1901 may include a panoramic area 1911 and an image display area 1912.

The panoramic area 1911 may include storage identification areas briefly indicated by dividing each of the plurality of storage rooms included in the refrigerating compartment.

The image display area 1912 may be an area for displaying images corresponding to areas selected by the user among storage identification areas included in the panoramic area 1911.

For example, when the vegetable compartment area 1911*a* and the multi-accommodation area 1911*b* included in the panoramic area 1911 are selected, the image display area 1912 may include a photographed image 1913 for the vegetable compartment area 1911*a* and a photographed image 1915 of the multi-accommodating area 1911*b*.

As another example, the refrigerator 10 may display only a photographed image 1913*a* corresponding to the first storage room 510 (vegetable compartment), in which foods are newly stored, on the image display area 1912.

That is, the refrigerator 10 may display images corresponding to the storage room, in which the foods are put, on the image display area 1912 based on the image photographed by the camera 121 among the plurality of storage rooms.

The panoramic view screen 1900 may further include a food management application icon 1917 for executing a food management application.

The food management application is installed in the refrigerator 10 and may be an application for managing the foods stored in the refrigerator 10.

When the refrigerator 10 receives an input for selecting the food management application icon 1917, as illustrated in FIG. 19*d*, the refrigerator 10 may display a food management screen 1930 on the transparent display 14-1.

The food management screen 1930 may include first food management information 1931 for the vegetable compartment and second food management information 1933 for the inner door 13.

The first food management information 1931 may include names of foods stored in the vegetable compartment, the number of each food, a storage period of each food, and a shopping cart button 1935 for preparing each food for purchase.

The second food management information 1933 may include names of foods stored in the inner door 13, the number of each food, a storage period of each food, and a shopping cart button 1935 for preparing each food for purchase.

The user may easily understand the storage state of the foods stored in each storage room through the food management information and may quickly purchase the desired food.

The food management screen 1930 may further include a recipe recommendation button 1937 and a shopping cart view button 1939.

The recipe recommendation button 1937 may be a button for recommending a recipe for performing cooking using the foods stored in the storage room.

The shopping cart view button 1939 may be a button for providing information on the food selected through the shopping cart button 1935.

Figure 19E:
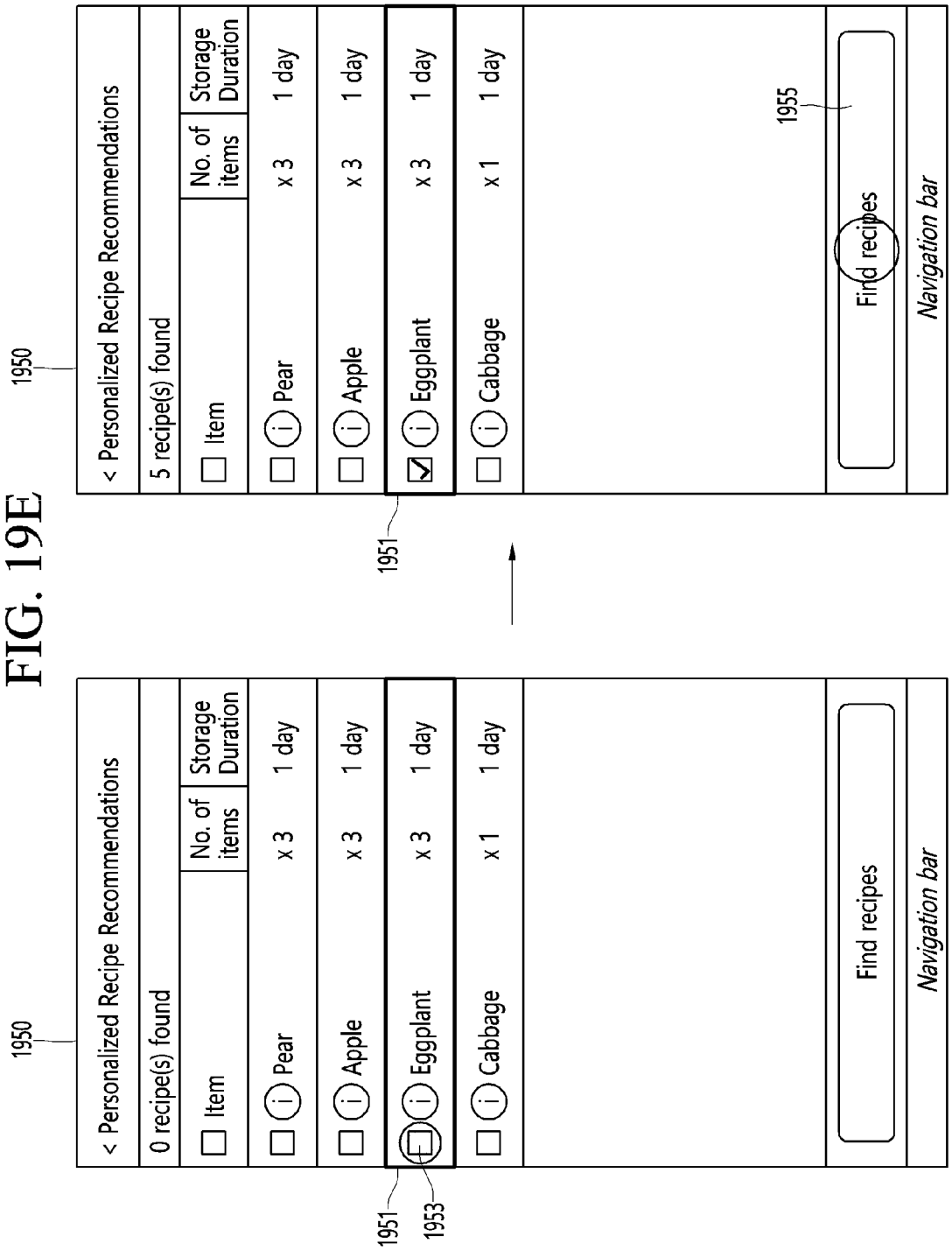

When the recipe recommendation button 1937 is selected, the refrigerator 10 may display a food selection screen 1950 as illustrated in FIG. 19e.

The refrigerator 10 may receive an input for selecting a check box 1553 of a specific food item 1951 included in the food selection screen 1950 and then receive an input for selecting a recipe search button 1955. In FIG. 19e, it is assumed that one food item is selected, but the present invention is not limited thereto, and a plurality of food items may be selected.

In response to the input of selecting the recipe search button 1955, the refrigerator 10 may display a recipe search screen 1970 as illustrated in FIG. 19f.

The recipe search screen 1970 may include a plurality of recipes capable of being cooked using foods corresponding to the selected specific food item 1951.

When a plurality of food items are selected, the recipe search screen 1970 may include recipes for dishes combining the plurality of selected food items.

Figure 19G:
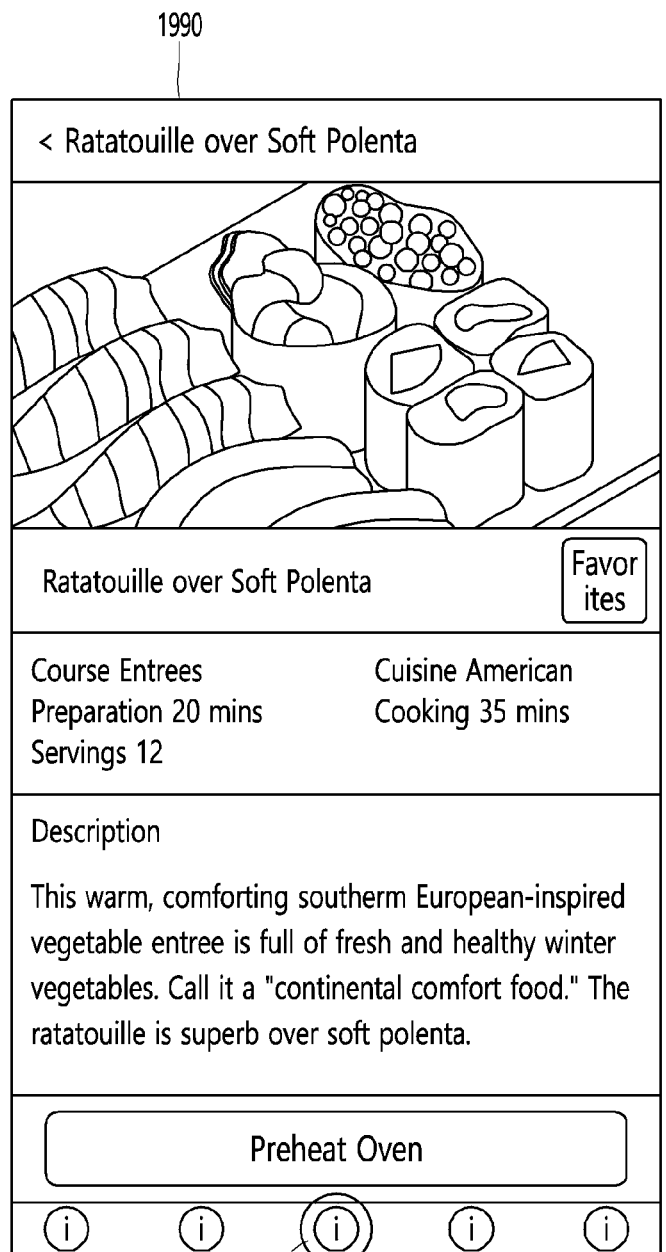

When the refrigerator 10 receives an input for selecting one recipe 1971 among the plurality of recipes, as illustrated in FIG. 19g, a recipe detail information screen 1990 including detailed information of the selected recipe 1971 may be displayed.

Referring to FIG. 19h, the recipe detail information screen 1990 may include a material item area 1991 including a plurality of ingredients required for the selected recipe 1971 and a recipe area 1993 including information on a cooking order.

The material item area 1991 may include a shopping cart button 1992 capable of putting a plurality of ingredients required for the recipe 1971 into a shopping list.

The recipe area 1993 may include a voice icon 1994 for outputting information about the cooking order by voice.

The refrigerator 10 may output recipe information by voice upon receiving the input for selecting the voice icon 1994.

As described above, according to an embodiment of the present invention, the user may easily check the recipe information using one or more selected foods only by selecting one or more foods stored in the refrigerator 10.

The refrigerator 10 may display a home screen on the transparent display 14-1 according to an input for selecting the home button 1999 included in a navigation bar.

Hereinafter, a process of acquiring a recommended recipe for a dish related to the foods stored in the refrigerator 10 will be described.

Figure 20:
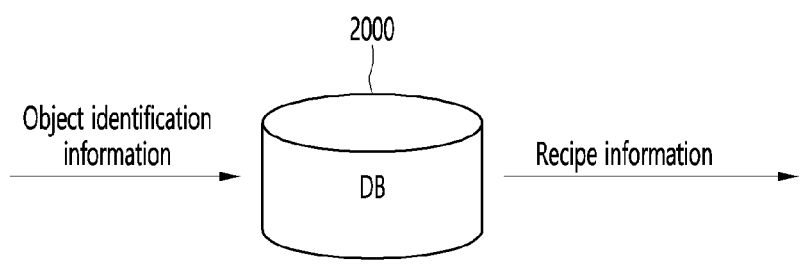
FIGS. 20 and 21 are views for explaining examples of recognizing foods stored in the refrigerator and acquiring recipe information of a dish using the recognized foods according to an embodiment of the present invention.
Figure 21:
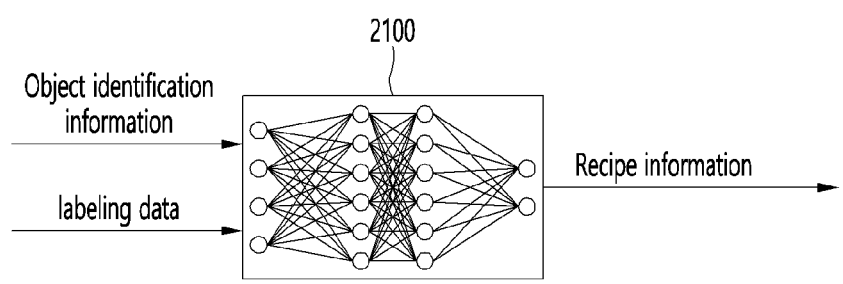

FIGS. 20 and 21 are views for explaining examples of recognizing foods stored in the refrigerator and acquiring recipe information of a dish using the recognized foods according to an embodiment of the present invention.

First, referring to FIG. 20, the refrigerator 10 may extract recipe information corresponding to object identification information based on information stored in a database 2000.

The database 2000 may be provided in the refrigerator 10 or may be provided in an external server.

The database 2000 may store a plurality of recipes for food and a plurality of recipes for a combination of foods.

The refrigerator 10 may recognize foods through the object identification information output from the object identification model 1700 of FIG. 17 and acquire one or more recipes related to the recognized food from the database 2000.

As another example, the AI server 200 may extract recipe information corresponding to the object identification information based on information stored in the database 2000. In this case, the AI server 200 may transmit the extracted recipe information to the refrigerator 10.

Next, FIG. 21 will be described.

FIG. 21 illustrates a recipe recommendation model 2100 based on an artificial neural network learned by a deep learning algorithm or a machine learning algorithm.

The recipe recommendation model 2100 may be a model that recommends recipe information by using the object identification information output from the object identification model 1700.

The recipe recommendation model 2100 may be learned by a learning processor 130 of the refrigerator 10 or a learning processor 240 of the AI server 200 and mounted on the refrigerator 10.

The recipe recommendation model 2100 may be a model learned through supervised learning.

The recipe recommendation model 2100 may be a model for recommending recipes related to foods from object identification information.

The recipe recommendation model 2100 may be a model that outputs recipe information using, as input data, a training data set including labeling data labeled with object identification information for learning and object identification information for learning.

The labeling data is correct answer data and may be recipe information.

The recipe recommendation model 2100 may be trained to minimize a cost function corresponding to a difference between the labeling data and the recipe information.

The cost function of the recipe recommendation model 2100 may be expressed as a square average of a difference between a label for object identification information and inferred recipe information.

When an input feature vector is extracted from the object identification information for training, the recipe recommendation result may be output as the target feature vector, and the recipe recommendation model 2100 may be learned to minimize a loss function corresponding to a difference between the output target feature vector and the labeled object identification information.

FIGS. 22a to 22f are views for explaining a process of displaying the food management information on the transparent display and providing information for ordering extracted foods when the foods are taken out from the storage room of the refrigerator according to an embodiment of the present invention.

Figure 22A:
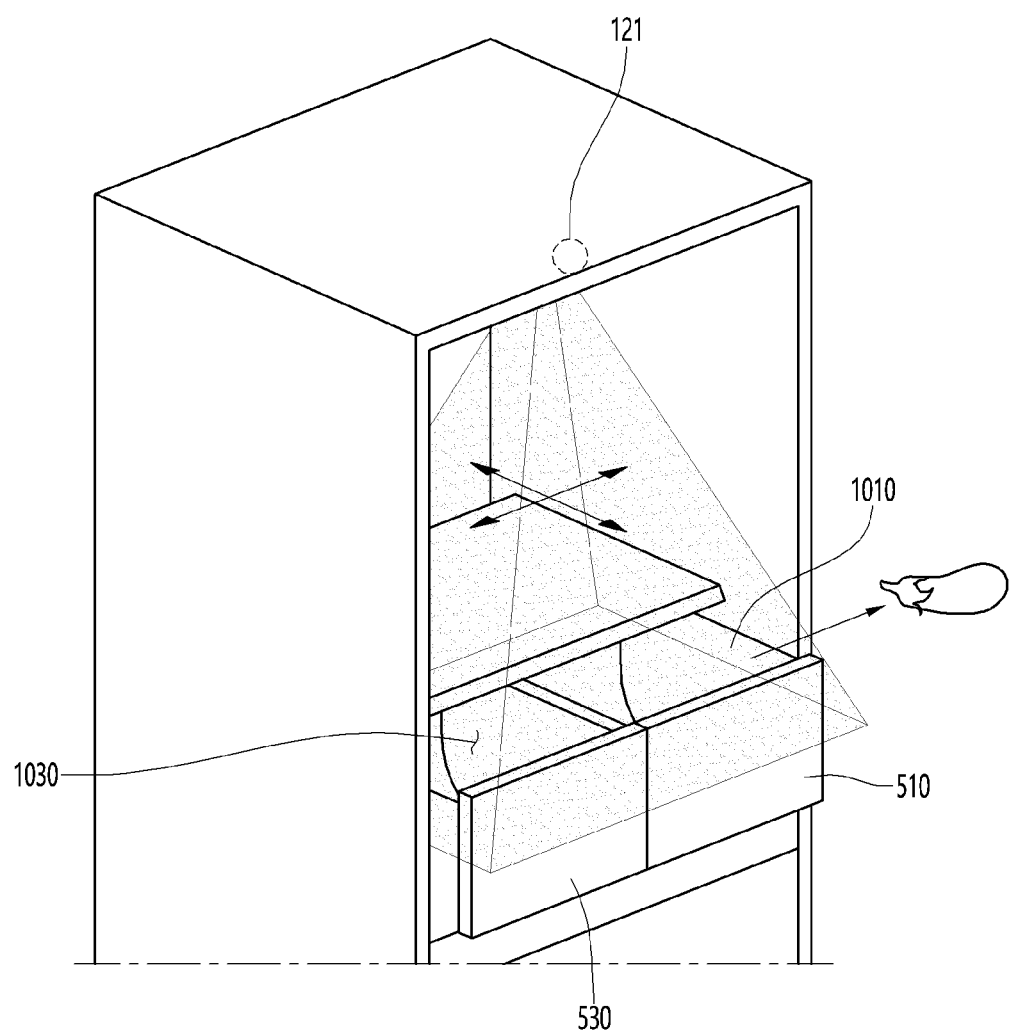
FIGS. 22a to 22f are views for explaining a process of displaying food management information on a transparent display and providing information for ordering extracted foods when the foods are taken out from the storage room of the refrigerator according to an embodiment of the present invention.

Referring to FIG. 22a, the user take one eggplant out of the storage space 1010 of the first storage room 510 provided in the refrigerator 10.

The refrigerator 10 may detect that the first storage room 510 is opened, and acquire either a maximum opening time point of the first storage room 510 or a closing time point of the first storage room 510 according to switching in moving direction.

The refrigerator 10 may transmit a capture command to the camera 121 at the acquired time point and may acquire an image of the first storage room 510 photographed by the camera 121.

The refrigerator 10 may acquire a food storage state for foods stored in the storage space 1010 of the first storage room 510 based on the acquired image.

The refrigerator 10 may display the food storage state or food management information based on the food storage state on the transparent display 14-1.

Figure 22B:
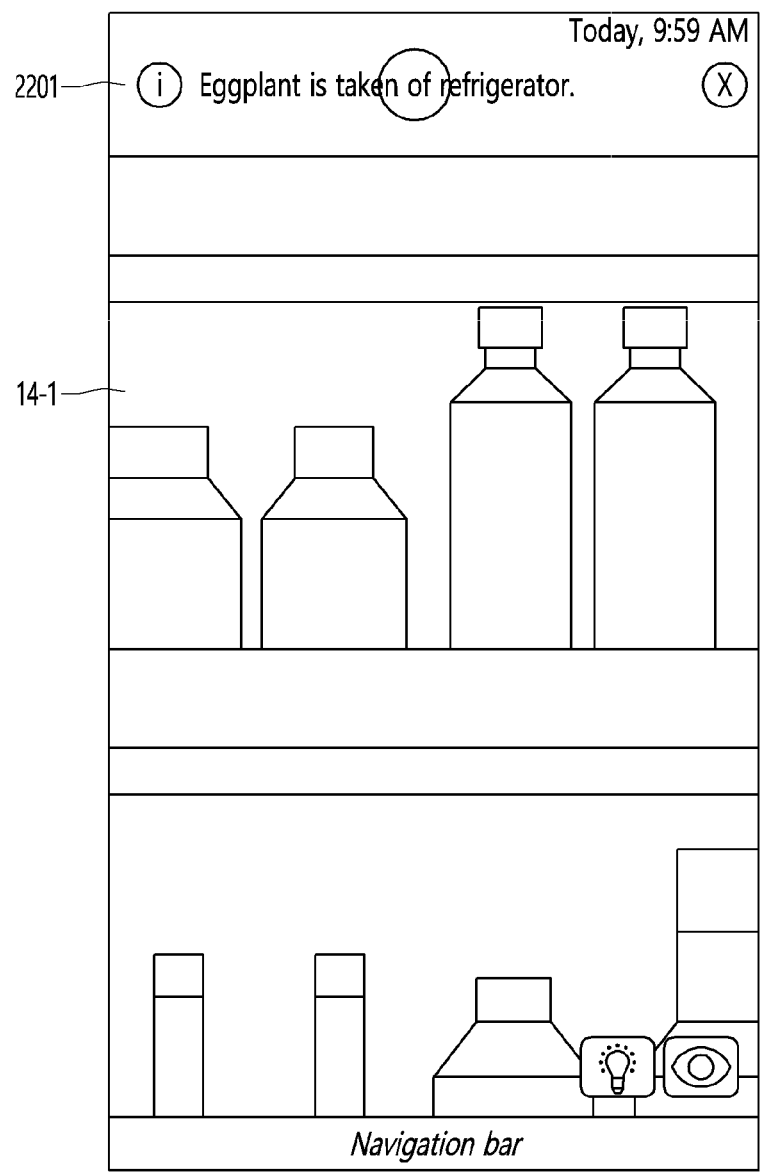

Referring to FIG. 22b, after the eggplant is taken out of the first storage room 510, the eggplant may be recognized through a food recognition process.

The refrigerator 10 may display a notification message 2201 indicating that the eggplant is taken out of the first storage room 510 on the transparent display 14-1.

That is, the notification message 2201 may display a message indicating which food is taken out which storage room in text form.

Figure 22C:
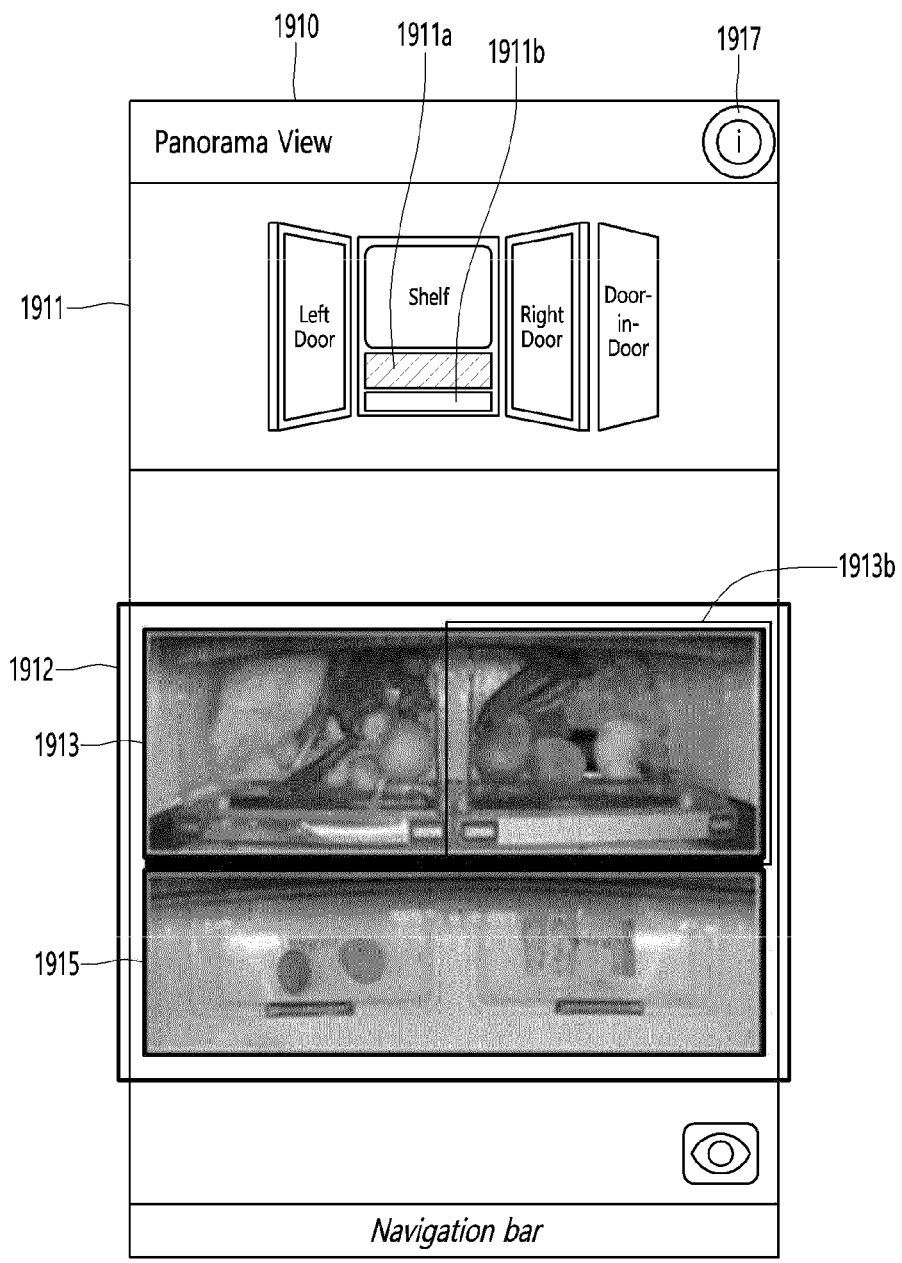

When an input for selecting the notification message 2201 is received, the refrigerator 10 may display a panoramic view screen 1910 on the transparent display 14-1 as illustrated in FIG. 22*c*.

The panoramic view screen 1910 is replaced with a content described with reference to FIG. 19*c*.

The refrigerator 10 may display a photographed image 1913*b* corresponding to the first storage room 510 (vegetable compartment), from which foods are newly taken out, on the image display area 1912.

That is, the refrigerator 10 may display images corresponding to the storage room, from which the foods are taken out, on the image display area 1912 based on the image photographed by the camera 121 among the plurality of storage rooms.

Figure 22D:
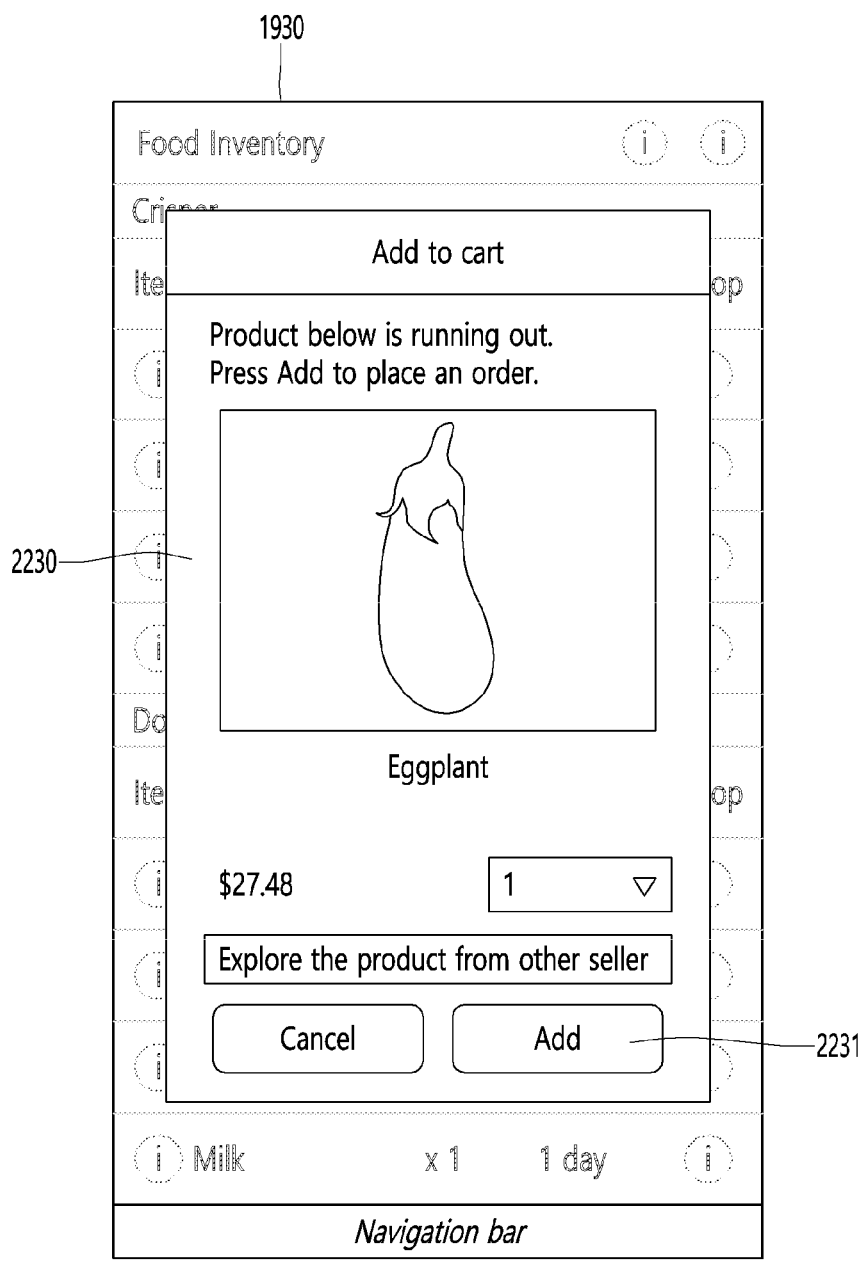

When the refrigerator 10 receives an input for selecting the food management application icon 1917, as illustrated in FIG. 22*d*, the refrigerator 10 may display a food management screen 1930 on the transparent display 14-1.

When the eggplant taken out of the first storage room 510 is not stored in the refrigerator 10, the refrigerator 10 may display a message indicating that the eggplant is out of stock and a pop-up window 2230 for adding the eggplant to the shopping list on the food management screen 1930.

The pop-up window 2230 may include a message indicating that the eggplant is out of stock, a price of the eggplant, and an add button 2231 for adding the eggplant to the shopping list.

Figure 22E:
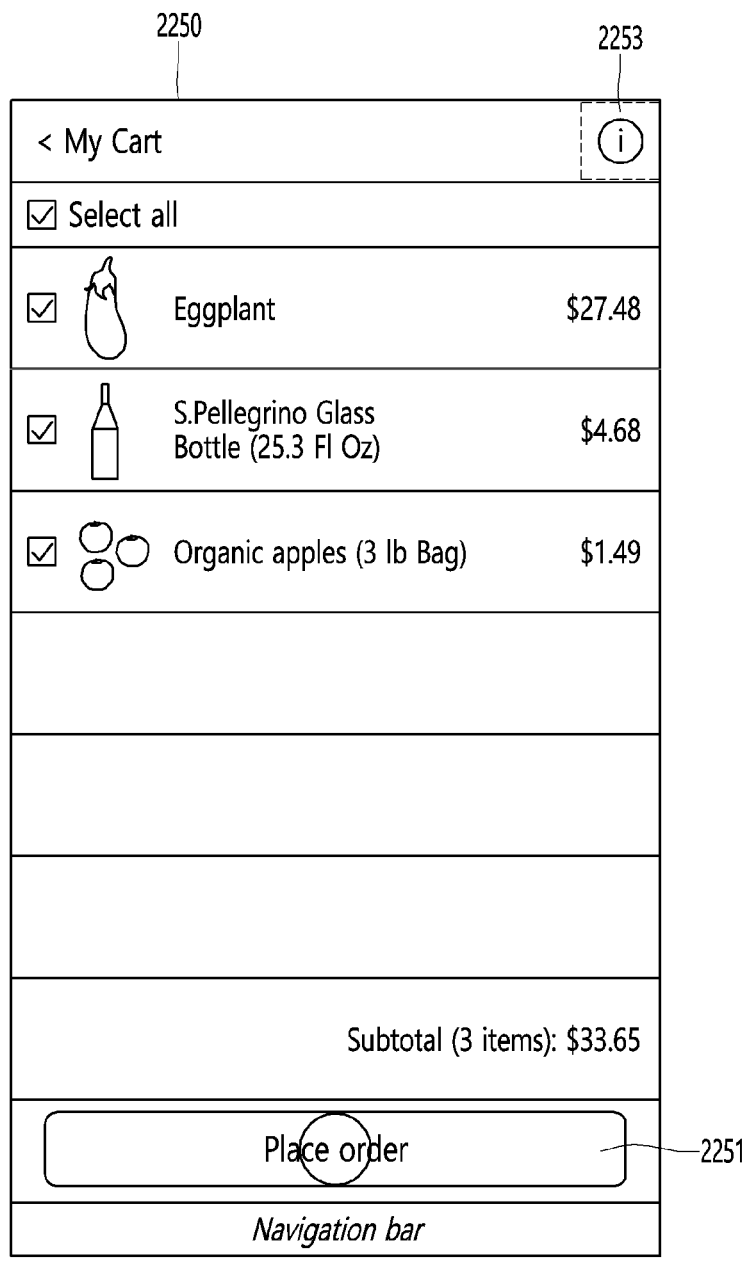

When receiving an input for selecting the add button 2231, the refrigerator 10 may display a shopping list screen 2250 on the transparent display 14-1 as illustrated in FIG. 22*e*.

The shopping list screen 2250 may include information on foods to be purchased selected by the user.

Figure 22F:

After a plurality of foods are selected by the shopping list screen 2250, when an order button 2251 is selected, the refrigerator 10 may display an order completion pup-up window 2270 indicating that the order has been completed, on the food management screen 1930 as illustrated in FIG. 22*f*.

The order completion pop-up window 2270 may include an order number and a time taken to deliver the ordered foods.

As described above, according to an embodiment of the present invention, an automatic shopping link function may be provided through the transparent display 14-1 of the refrigerator 10, and thus, inconveniences of the user having to go directly to buy food or directly access a shopping mall application may be eliminated.

The above-described present disclosure may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. Also, the computer may include the processor 180 of the artificial intelligence server.

The invention claimed is:

1. An artificial intelligence refrigerator comprising:
   a display;
   a cabinet having a storage room configured to receive a food object;
   a camera provided in the cabinet and configured to capture an image of the storage room;
   a storage room sensor configured to detect whether the storage room is opened or closed; and
   a processor configured to:
      control, based on the storage room sensor detecting that the storage room is opened, the camera to capture the image of the storage room,
      transmit, based on a maximum opening time point or a closing time point of the storage room being detected through processing of the captured image, a capture command to the camera the closing time point being a time point at which the storage room starts closing,
      acquire a storage state of the storage room based on an image captured according to the capture command, and
      control the display to display food management information based on the acquired storage state.

2. The artificial intelligence refrigerator according to claim 1, wherein the processor is configured to acquire a time point, at which a moving direction of the storage room is switched from an opening direction to a closing direction, as the closing time point.

3. The artificial intelligence refrigerator according to claim 2, wherein the processor is configured to:
   determine that the moving direction of the storage room is switched based on a first vector direction of a point included in a first image captured at a first time point and a second vector direction of a point included in a second image captured at a second time point being different from each other, and
   acquire a time point, at which the vector direction is switched, as the closing time point.

4. The artificial intelligence refrigerator according to claim 1, wherein the processor is configured to:
   acquire a plurality of images respectively corresponding to a plurality of time points from the camera, and
   extract an image having a maximum surface area of the storage room among the acquired plurality of images and acquire a time point of the extracted image as the maximum opening time point of the storage room.

5. The artificial intelligence refrigerator according to claim 4, wherein the processor is configured to:
   recognize a boundary area of the storage room from each of the plurality of images,
   delete a lower area of the recognized boundary area and acquire a remaining area for the each of the plurality of images, and
   compare surface areas of the acquired remaining areas of the plurality of images to each other so that an image corresponding to one remaining area having a largest surface area among the remaining areas is extracted as the image having the maximum surface area of the storage room.

6. The artificial intelligence refrigerator according to claim 1, wherein the storage room sensor comprises a first reed switch and a second reed switch, and wherein the processor is configured to:
- detect whether an end of the first reed switch contacts an end of the second reed switch based on movement of a magnet attached to one side of the storage room, and
- detect that the storage room is opened based on a detection that the end of the first reed switch does not contact the end of the second reed switch.

7. The artificial intelligence refrigerator according to claim 1, further comprising a memory,
wherein the processor is configured to:
- acquire an object boundary box containing the food object from the image by using an object detection model stored in the memory, and
- identify the food object from the object boundary box by using an object identification model stored in the memory,
wherein each of the object detection model and the object identification model comprises an artificial neural network-based model learned through a deep learning algorithm or a machine learning algorithm.

8. The artificial intelligence refrigerator according to claim 7, wherein the processor is configured to:
- acquire the storage state that indicates presence of the food object based on the identified food object, and
- control the display to display an alarm that notifies the storage state.

9. The artificial intelligence refrigerator according to claim 8, wherein the processor is configured to control the display to display the food management information including at least one of inventory change information of the food object, purchase linkage information of the food object, and recipe information of a dish using the food object, based on the storage state.

10. The artificial intelligence refrigerator according to claim 1, further comprising a communication interface configured to communicate with an artificial intelligence (AI) server,
wherein the processor is configured to:
- transmit the captured image to the AI server through the communication interface, and
- receive the storage state and the food management information from the AI server.

11. The artificial intelligence refrigerator according to claim 1, further comprising an outer door rotatably mounted on the cabinet,
wherein the processor is configured to control the display to display the food management information after the outer door is closed.

12. The artificial intelligence refrigerator according to claim 11, wherein the display comprises a transparent display configured to illuminate an inside of the refrigerator.

13. The artificial intelligence refrigerator according to claim 1, wherein the camera is disposed on a ceiling of the cabinet and configured to capture an image of a lower side of the cabinet.

14. A method for operating an artificial intelligence refrigerator, the method comprising:
- detecting that a storage room provided in the artificial intelligence refrigerator is opened using a storage room sensor;
- controlling, based on the storage room sensor detecting that the storage room is opened, a camera to capture an image of the storage room;
- detecting a maximum opening time point or a closing time point of the storage room through processing of the captured image, the closing time point being a time point at which the storage room starts closing;
- transmitting, based on the maximum opening time point of the storage room or the closing time point of the storage room being detected, a capture command to the camera;
- acquiring a storage state of the storage room based on an image captured according to the capture command; and
- displaying food management information on a display based on the acquired storage state.

15. The method according to claim 14, further comprising acquiring a time point, at which a moving direction of the storage room is switched from an opening direction to a closing direction, as the closing time point.

16. The method according to claim 15, further comprising:
- determining that the moving direction of the storage room is switched based on a first vector direction of a point included in a first image captured at a first time point and a second vector direction of a point included in a second image captured at a second time point being different from each other; and
- acquiring a time point, at which the vector direction is switched, as the closing time point.

17. The method according to claim 14, further comprising:
- acquiring a plurality of images respectively corresponding to a plurality of time points from the camera; and
- extracting an image having a maximum surface area of the storage room among the acquired plurality of images and acquiring a time point of the extracted image as the maximum opening time point of the storage room.

18. The method according to claim 17, further comprising:
- recognizing a boundary area of the storage room from each of the plurality of images;
- deleting a lower area of the recognized boundary area and acquiring a remaining area for the each of the plurality of images; and
- comparing surface areas of the acquired remaining areas of the plurality of images to each other so that an image corresponding to one remaining area having a largest surface area among the remaining areas is extracted as the image having the maximum surface area of the storage room.

19. The method according to claim 14, further comprising:
- acquiring an object boundary box containing a food object from the image by using an object detection model stored in a memory, and
- identifying the food object from the object boundary box by using an object identification model stored in the memory,
wherein each of the object detection model and the object identification model comprises an artificial neural network-based model learned through a deep learning algorithm or a machine learning algorithm.

20. A non-transitory computer-readable medium; having stored thereon a program for causing a processor implemented in an artificial intelligence refrigerator to execute operations comprising:
- detecting that a storage room provided in the artificial intelligence refrigerator is opened using a storage room sensor;

controlling, based on the storage room sensor detecting that the storage room is opened, a camera to capture an image of the storage room;

detecting a maximum opening time point or a closing time point of the storage room through processing of the captured image, the closing time point being a time point at which the storage room starts closing;

transmitting, based on the maximum opening time point of the storage room or the closing time point of the storage room being detected, a capture command to the camera;

acquiring a storage state of the storage room based on an image captured according to the capture command; and displaying food management information on a display based on the acquired storage state.

* * * * *